(12) United States Patent
Yonezawa et al.

(10) Patent No.: US 11,187,877 B2
(45) Date of Patent: Nov. 30, 2021

(54) ZOOM LENS AND IMAGING APPARATUS

(71) Applicant: FUJIFILM Corporation, Tokyo (JP)

(72) Inventors: Masaru Yonezawa, Saitama (JP); Motoari Ota, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 304 days.

(21) Appl. No.: 16/542,097

(22) Filed: Aug. 15, 2019

(65) Prior Publication Data

US 2020/0064604 A1 Feb. 27, 2020

(30) Foreign Application Priority Data

Aug. 21, 2018 (JP) .............................. JP2018-154925

(51) Int. Cl.
*G02B 15/14* (2006.01)
*G02B 15/20* (2006.01)
*G02B 15/177* (2006.01)

(52) U.S. Cl.
CPC ... *G02B 15/144507* (2019.08); *G02B 15/177* (2013.01); *G02B 15/20* (2013.01)

(58) Field of Classification Search
CPC ............ G02B 15/14; G02B 15/144507; G02B 15/177
USPC ................................................. 359/676, 686
See application file for complete search history.

(56) References Cited

U.S. PATENT DOCUMENTS

| | | |
|---|---|---|
| 2013/0070123 A1 | 3/2013 | Imaoka |
| 2013/0120640 A1* | 5/2013 | Taki ....................... H04N 5/225 348/345 |
| 2017/0276917 A1* | 9/2017 | Iwamoto ........ G02B 15/143105 |

FOREIGN PATENT DOCUMENTS

| | | |
|---|---|---|
| JP | 2013-068689 A | 4/2013 |
| JP | 2015-212724 A | 11/2015 |
| JP | 2017-203916 A | 11/2017 |

OTHER PUBLICATIONS

An Office Action; "Notice of Reasons for Refusal", mailed by the Japanese Patent Office dated Aug. 31, 2021, which corresponds to Japanese Patent Application No. 2018-154925 and is related to U.S. Appl. No. 16/542,097; with English language translation.

* cited by examiner

*Primary Examiner* — James R Greece
(74) *Attorney, Agent, or Firm* — Studebaker & Brackett PC

(57) ABSTRACT

A zoom lens consists of, in order from an object side, a focusing group, a zoom group, and a subsequent group. The focusing group consists of, in order from the object side, a front focusing group which does not move with respect to the image plane during zooming and focusing, a middle focusing group which consists of one or two positive lens groups each moving during focusing, and a rear focusing group which consists of a negative lens group moving during zooming and focusing. The rear focusing group has a zoom range in which the amount of movement during focusing changes in accordance with the zoom position and the rear focusing group moves to the image side during focusing from the object at infinity to the closest object. Predetermined conditional expressions relating to the amount of movement of the rear focusing group are satisfied.

17 Claims, 24 Drawing Sheets

EXAMPLE 1

EXAMPLE 1

FIG. 2
EXAMPLE 1
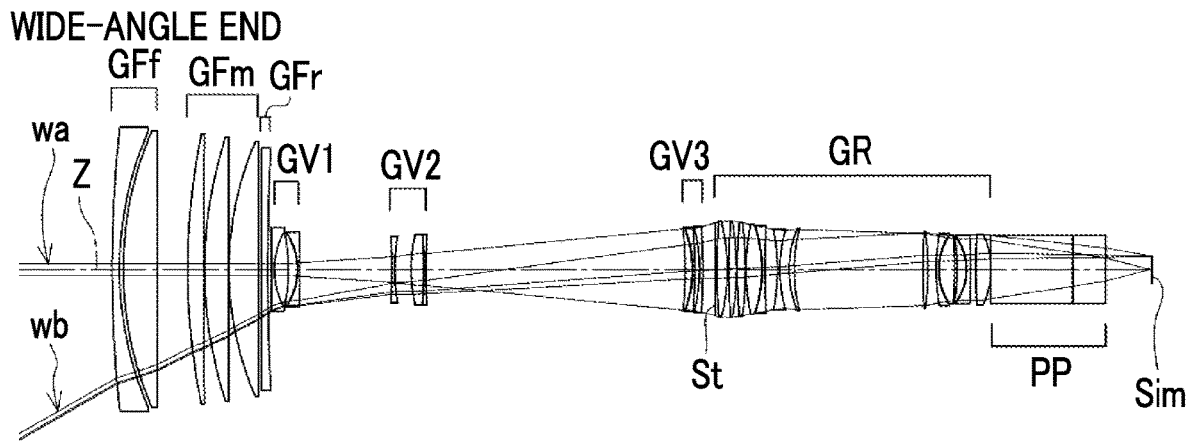
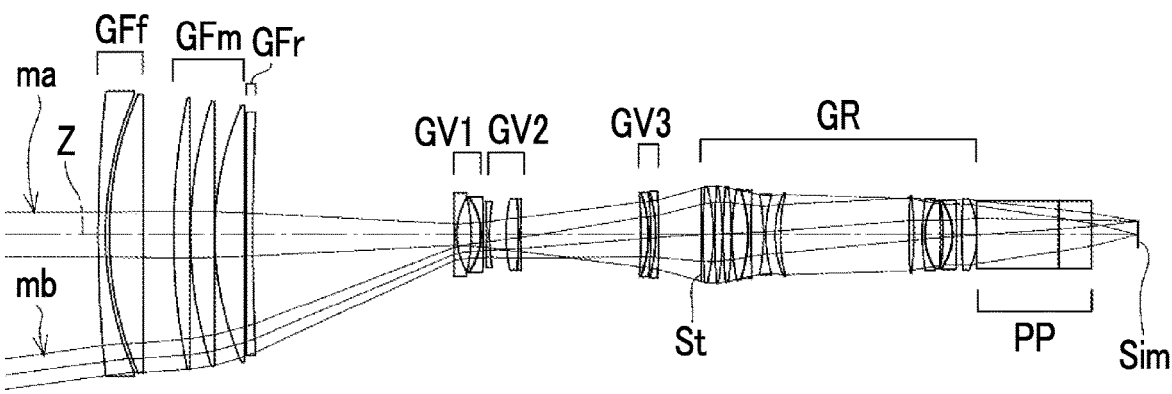
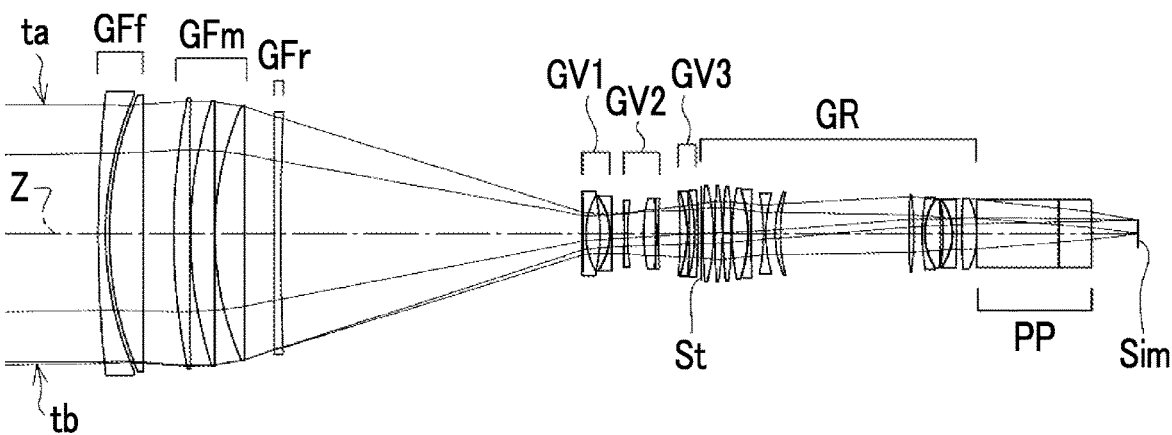

EXAMPLE 2

EXAMPLE 3

EXAMPLE 4

EXAMPLE 5

EXAMPLE 6

EXAMPLE 7

FIG. 11
EXAMPLE 1
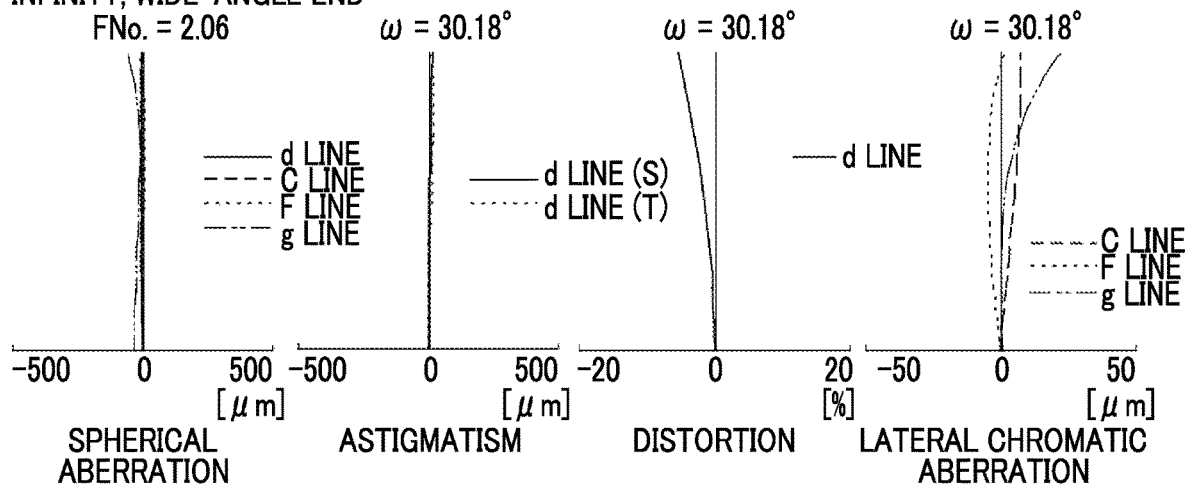
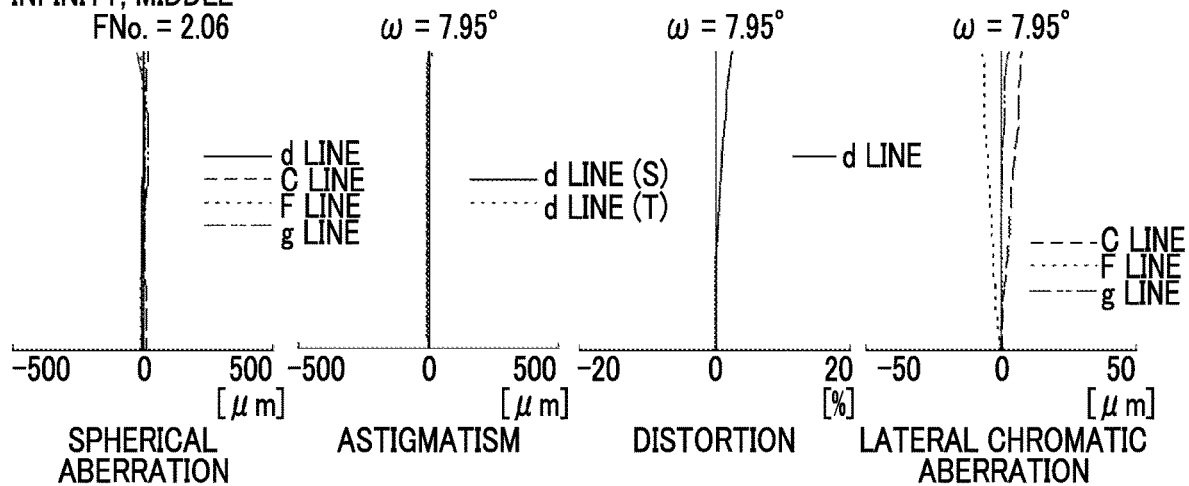
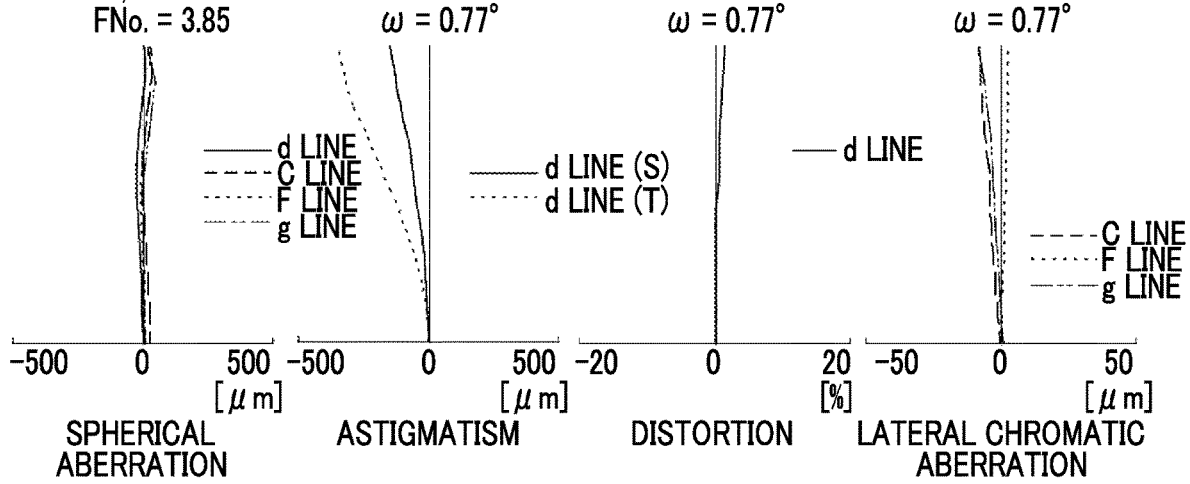

FIG. 12
EXAMPLE 1
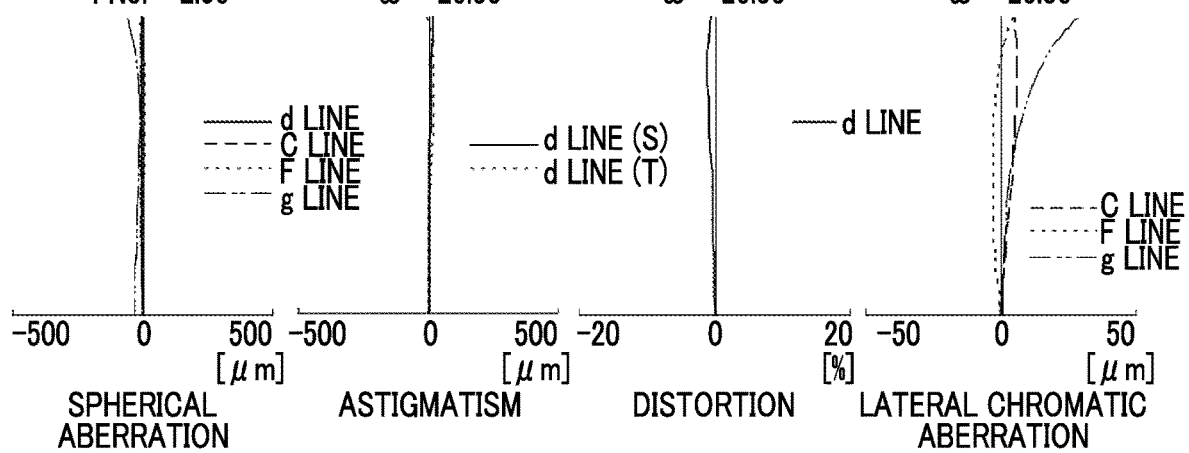
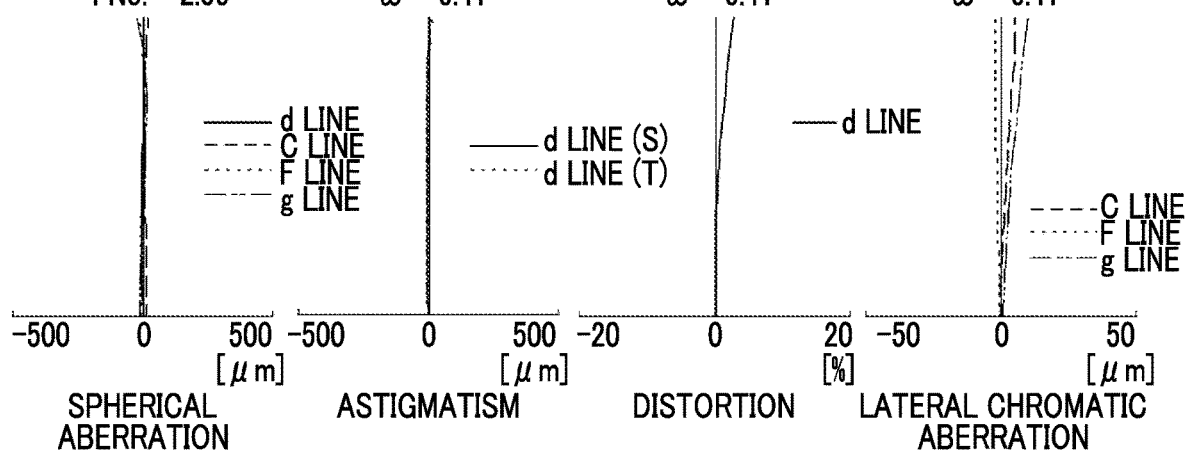
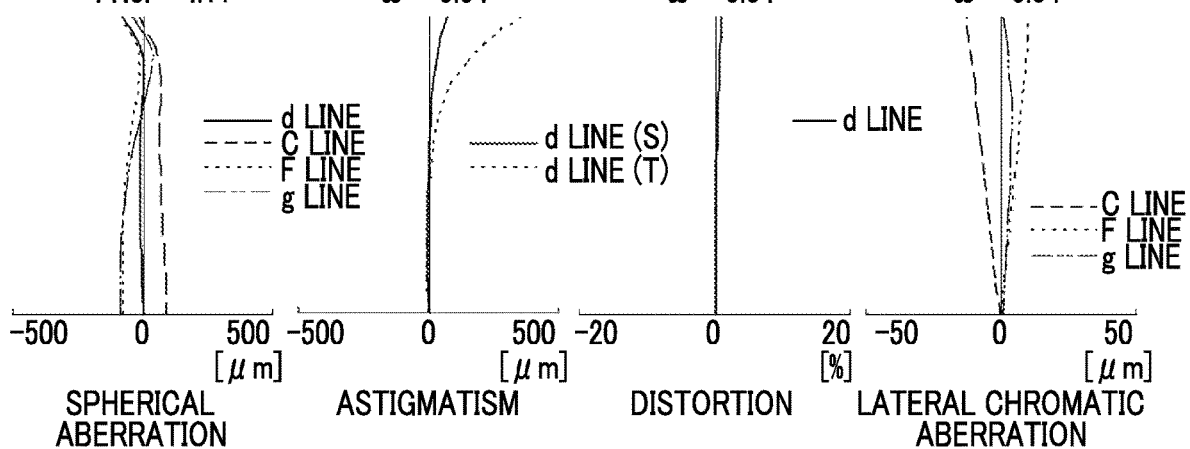

FIG. 13
EXAMPLE 2
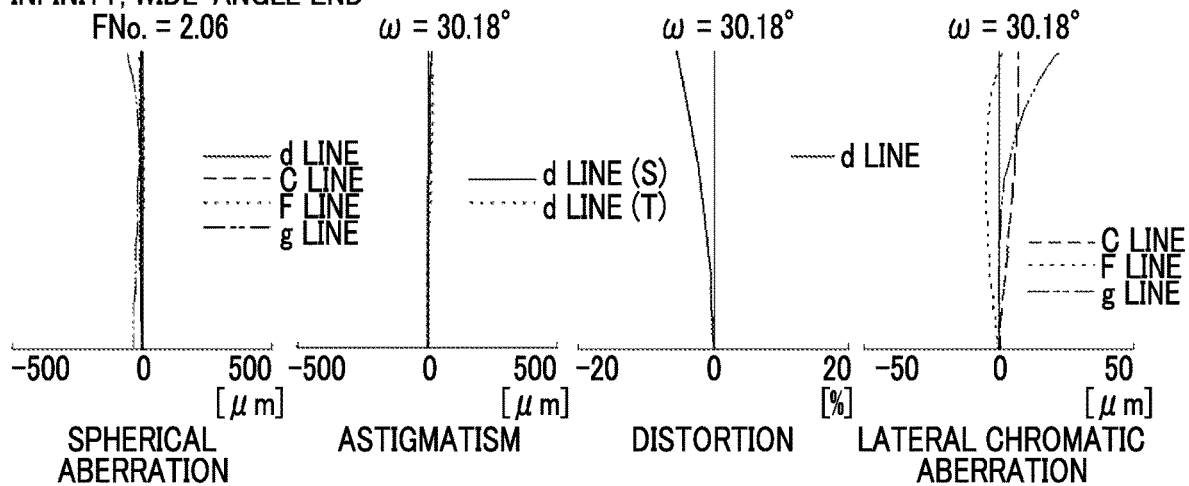
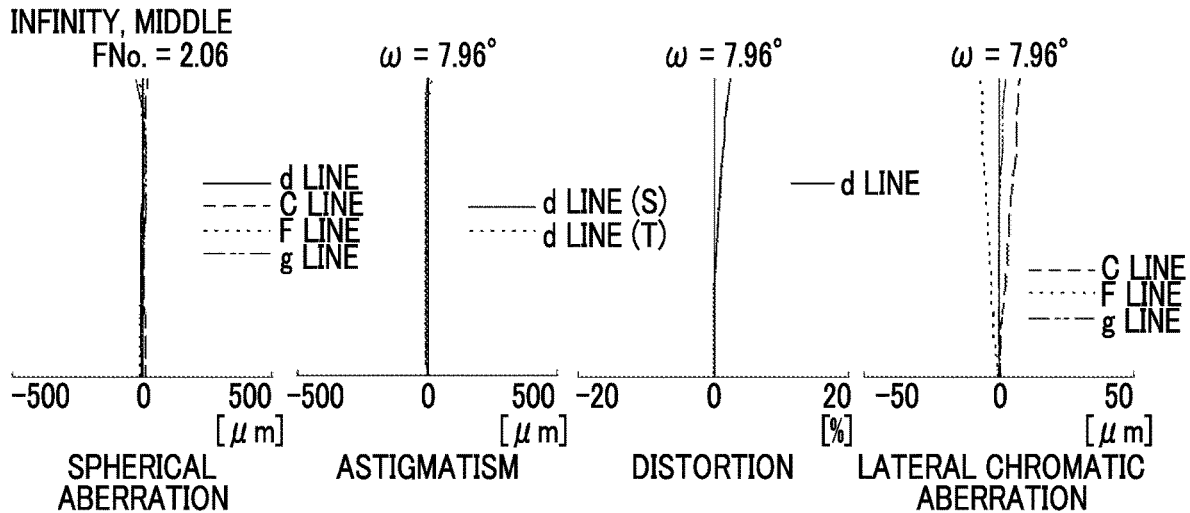
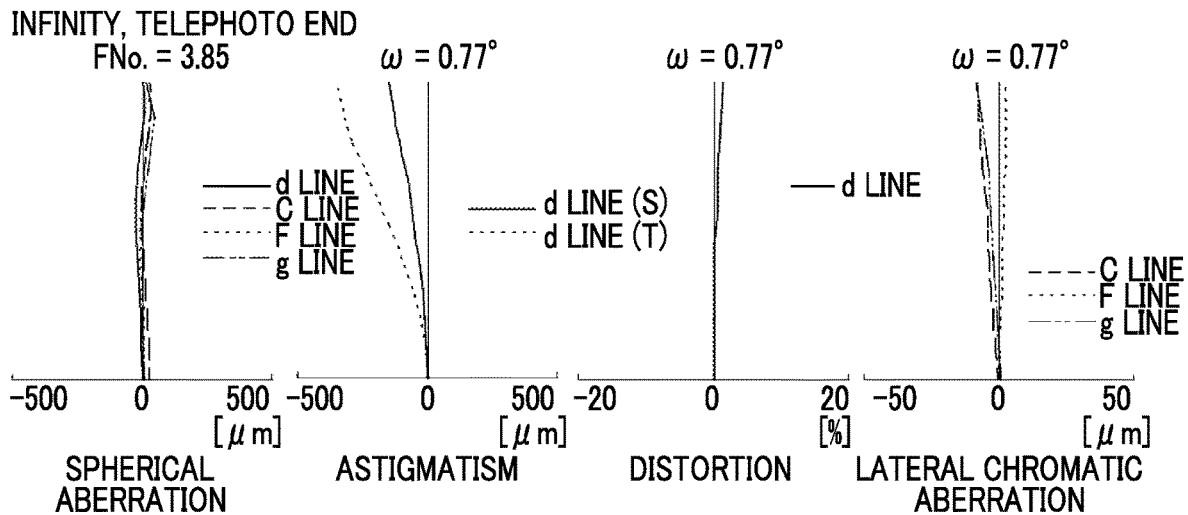

EXAMPLE 2

FIG. 15
EXAMPLE 3
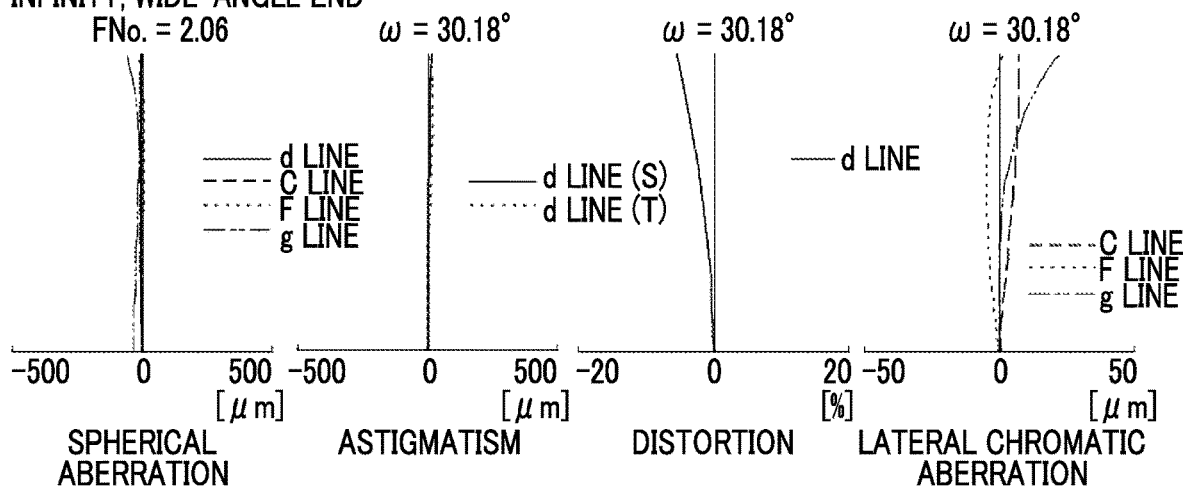
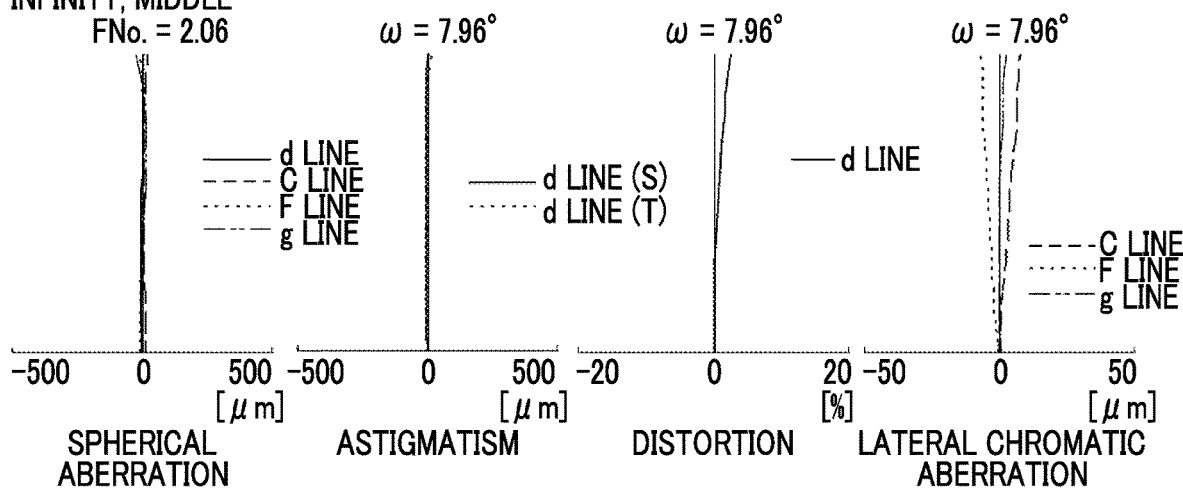
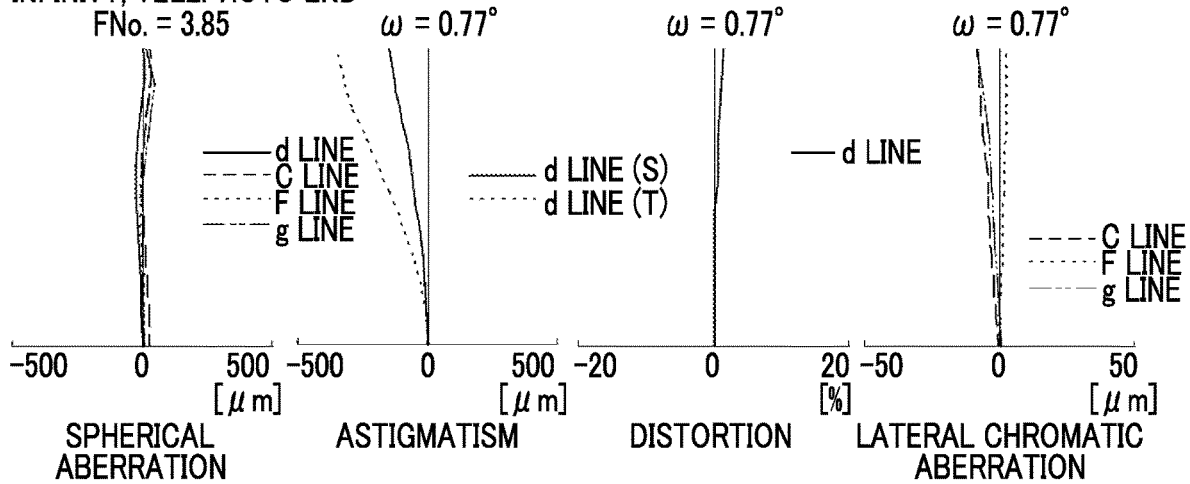

EXAMPLE 3

FIG. 17
EXAMPLE 4
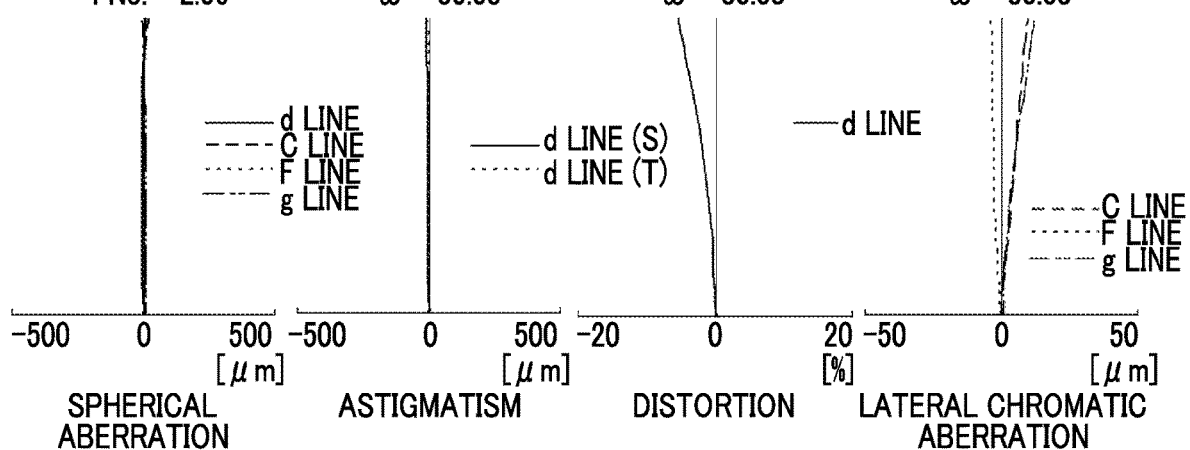
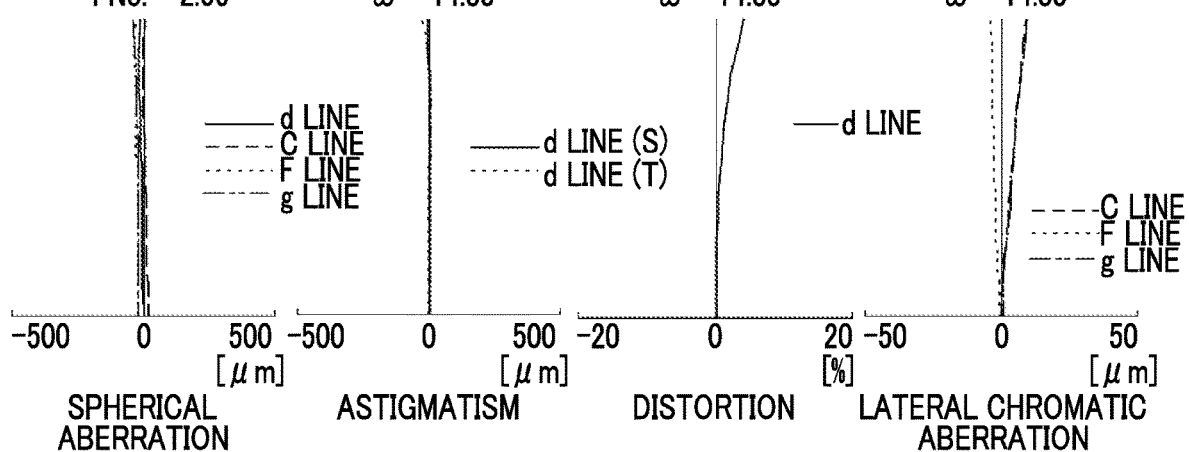
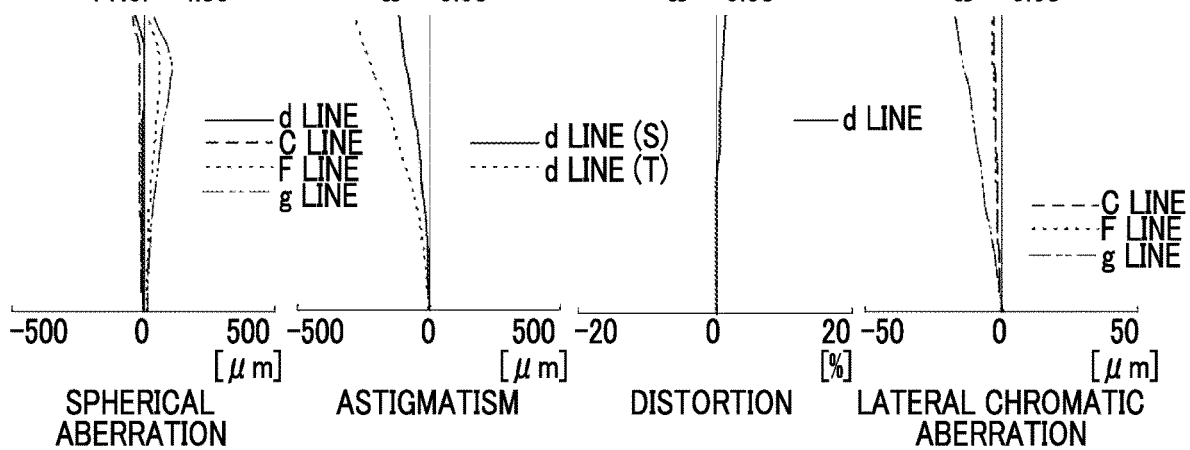

FIG. 18
EXAMPLE 4
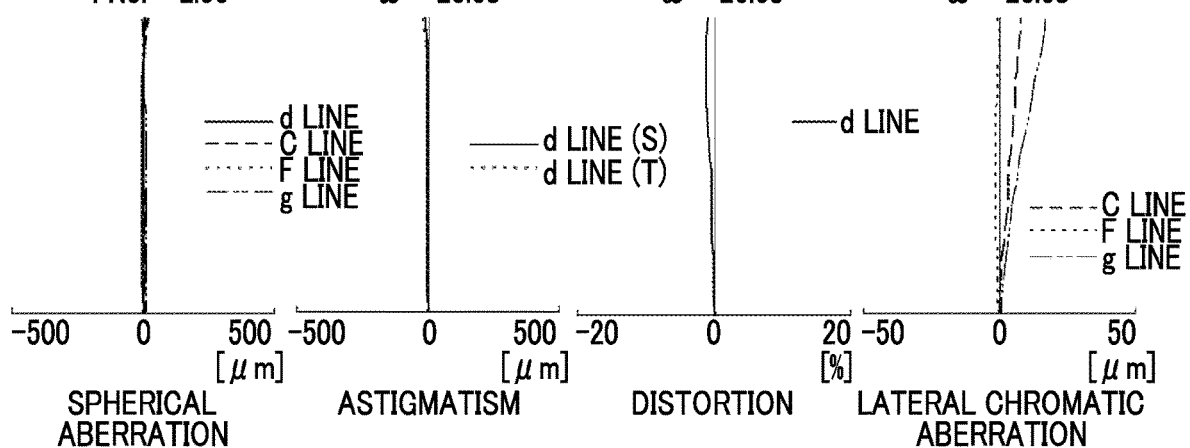
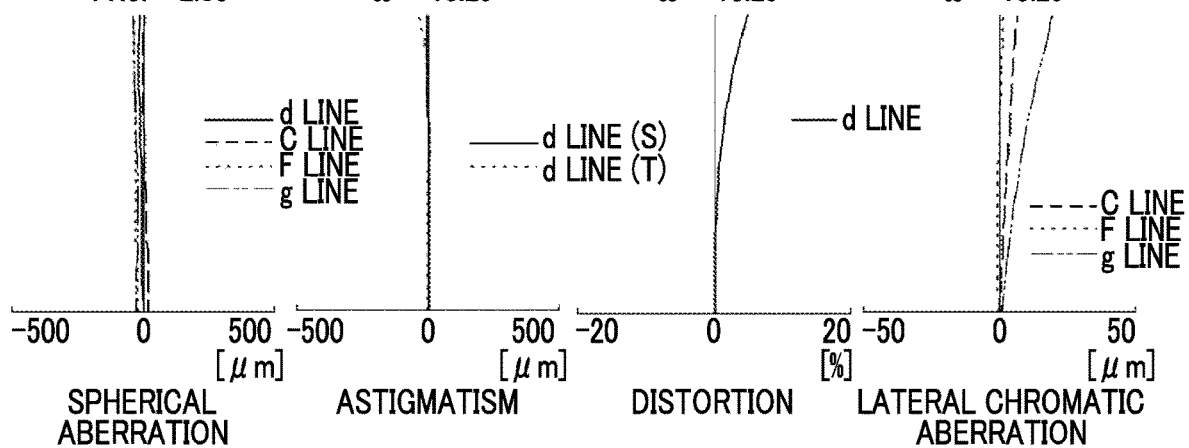
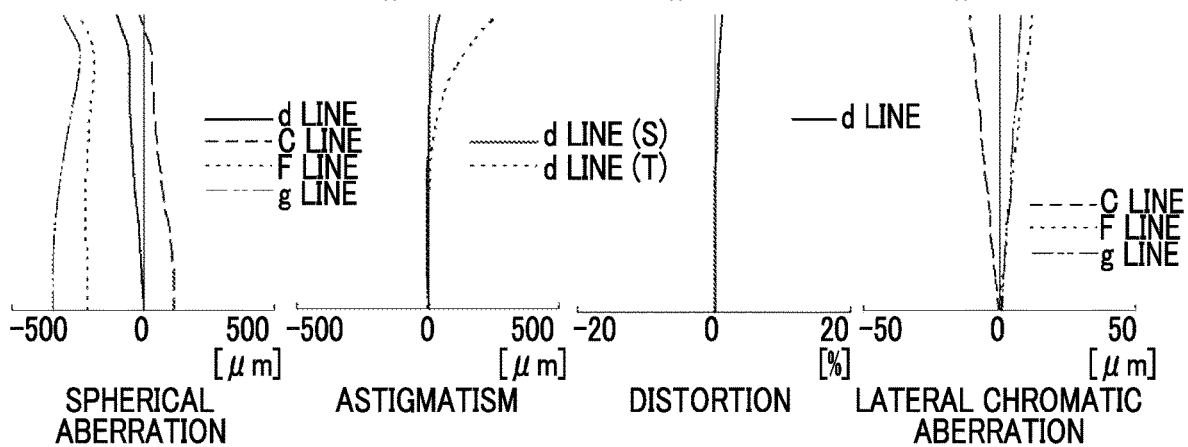

FIG. 19
EXAMPLE 5
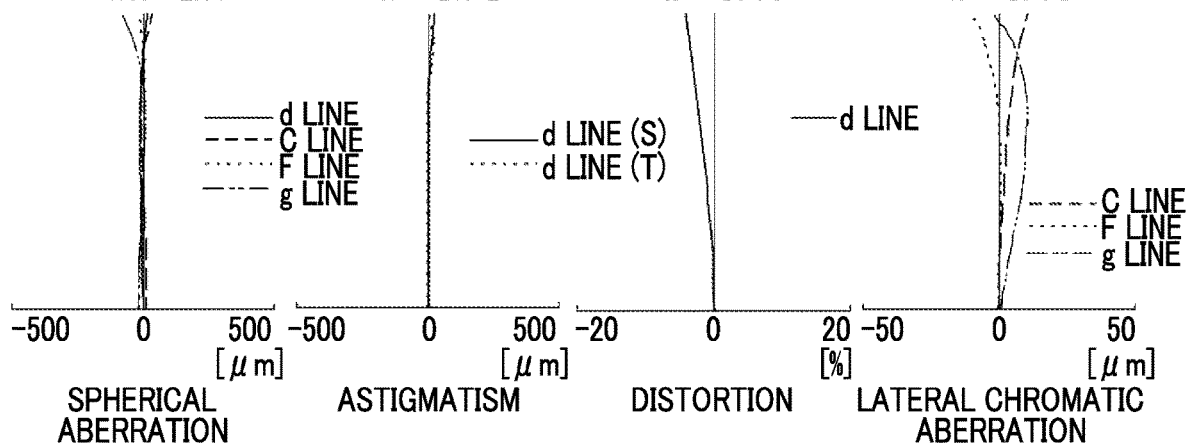
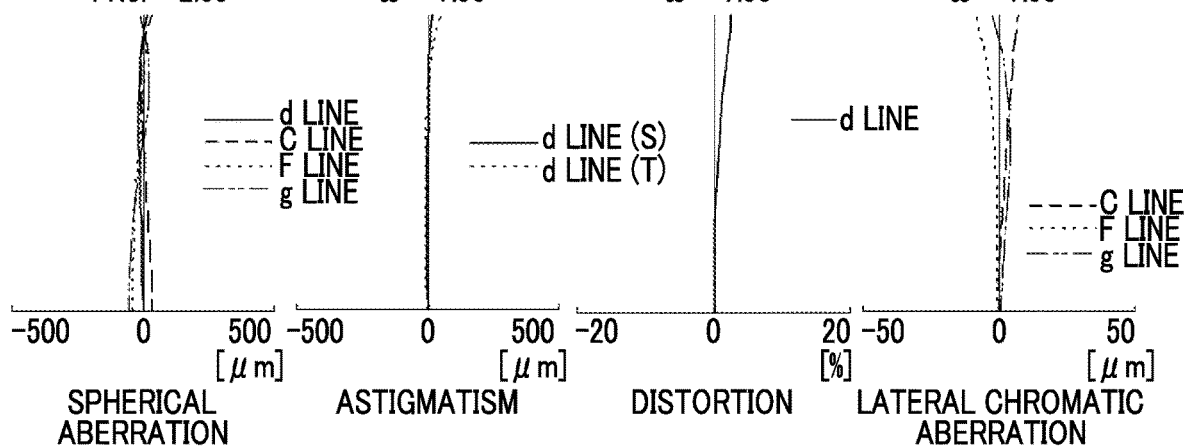
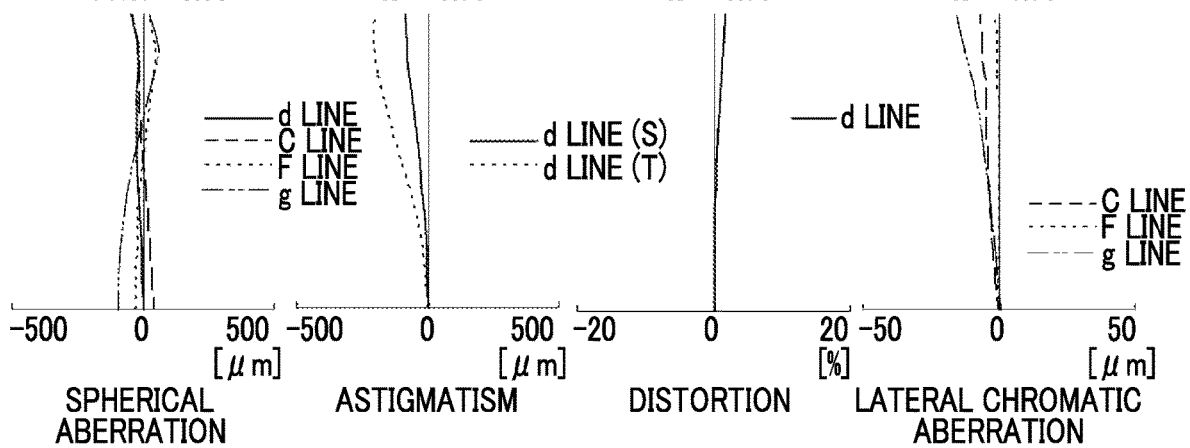

FIG. 21
EXAMPLE 6
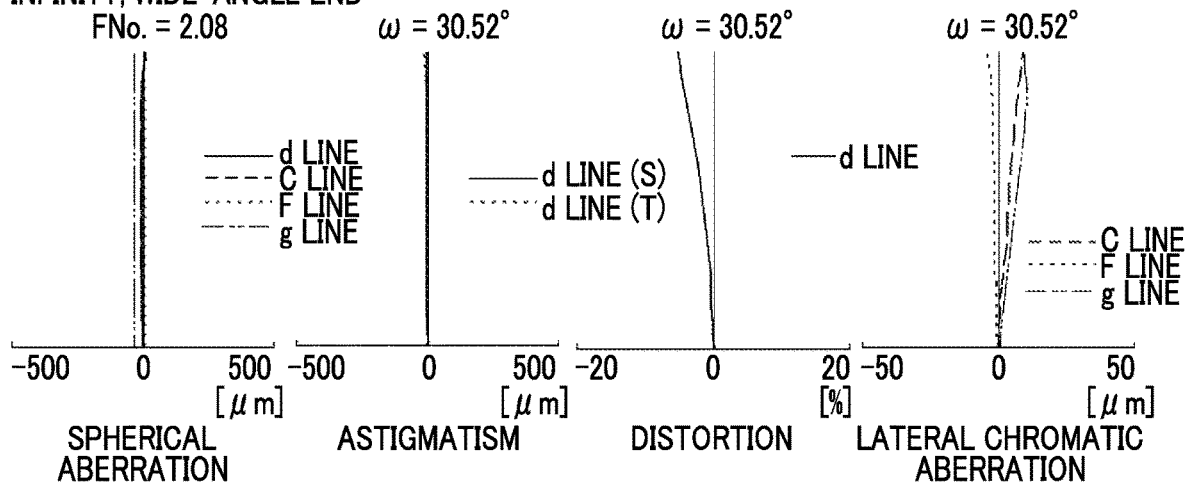
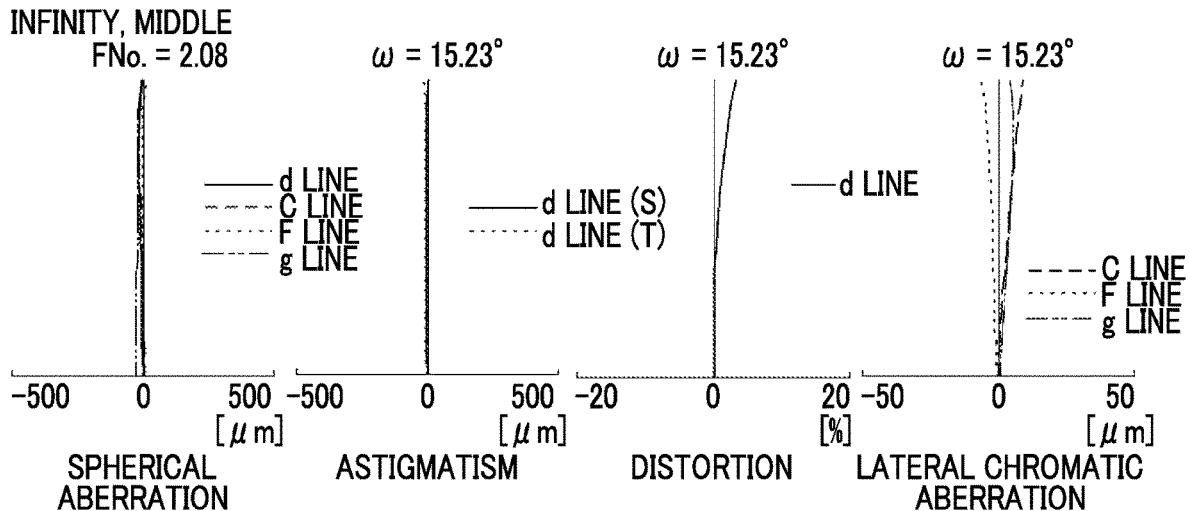
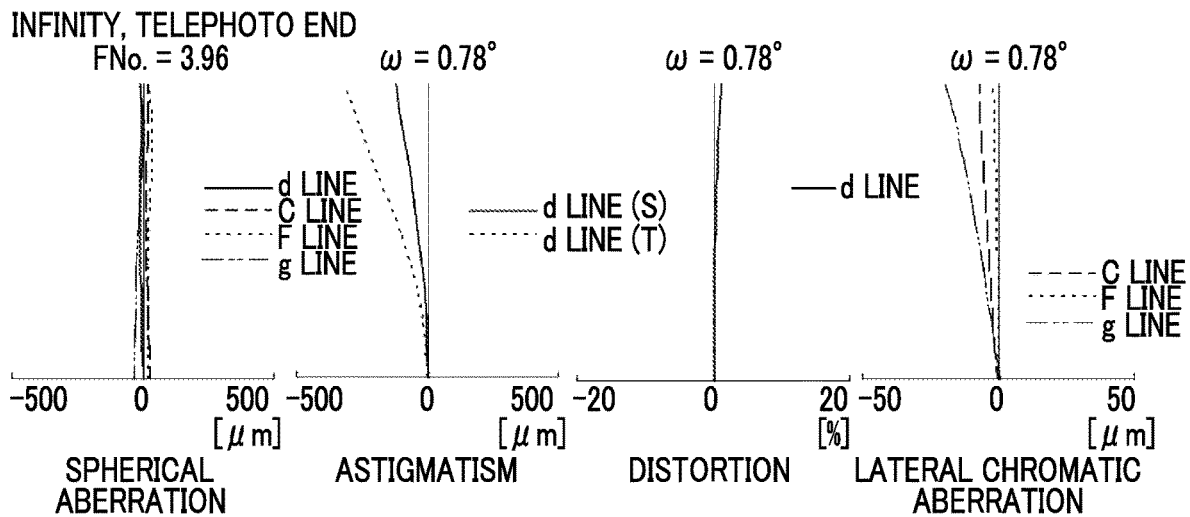

FIG. 23
EXAMPLE 7
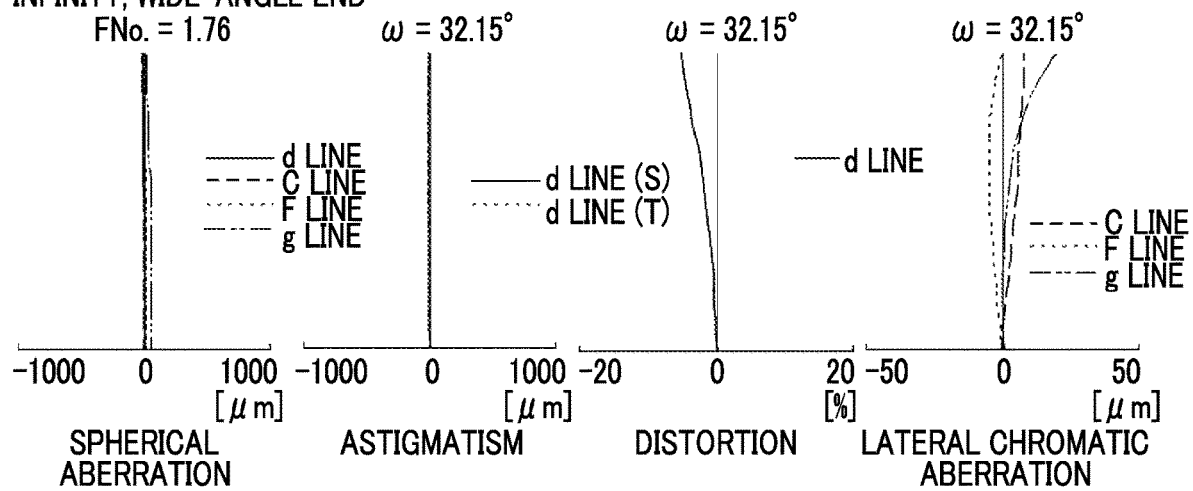
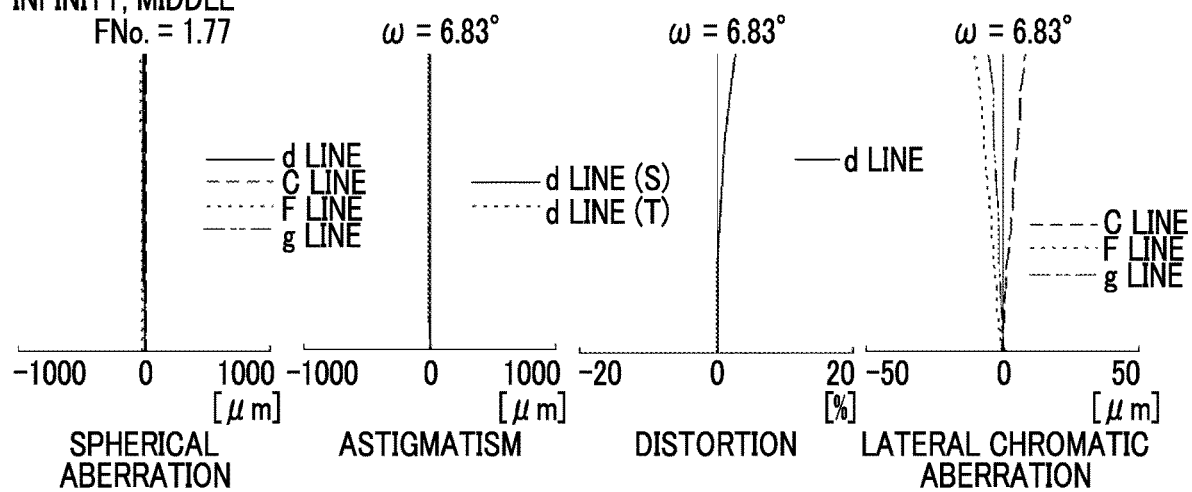
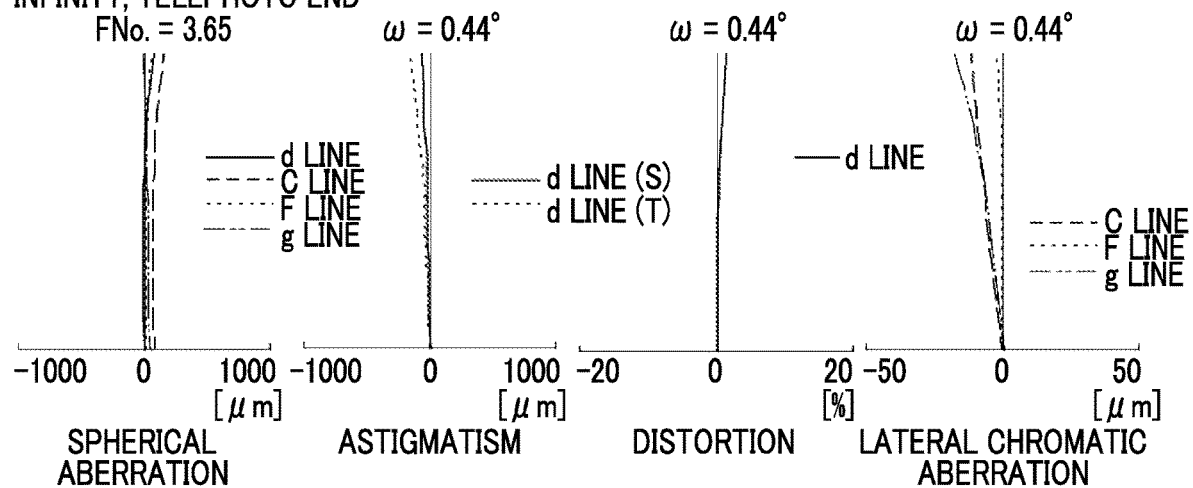

FIG. 24
EXAMPLE 7
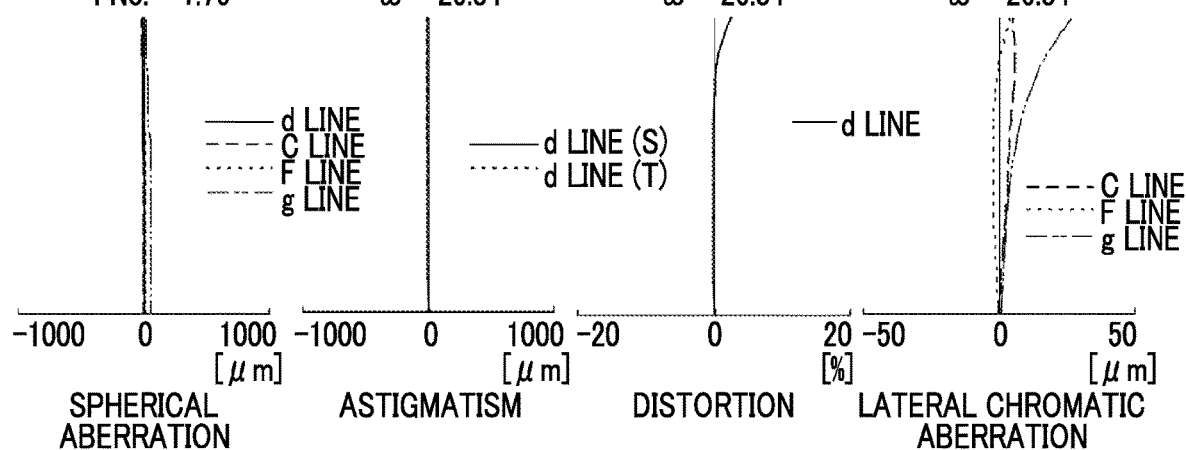
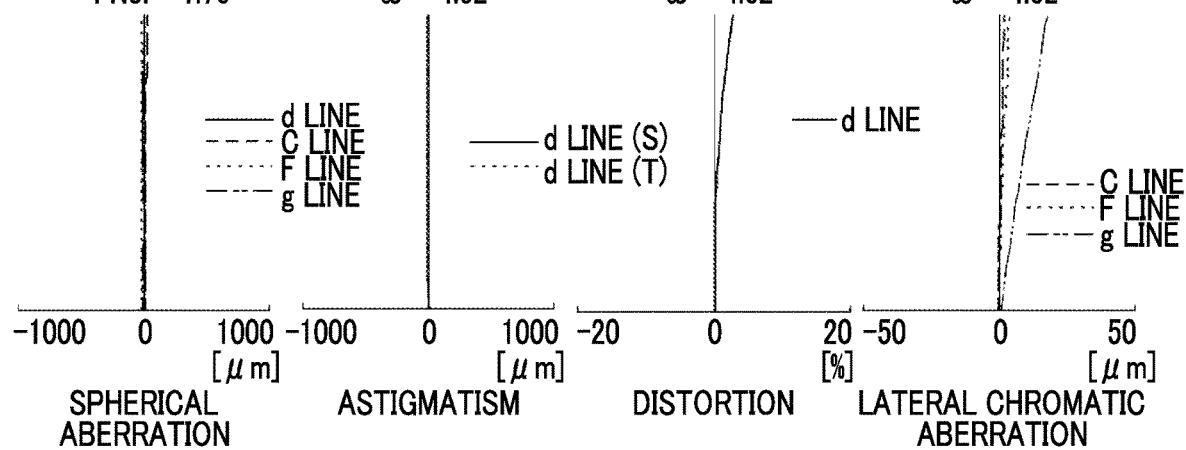
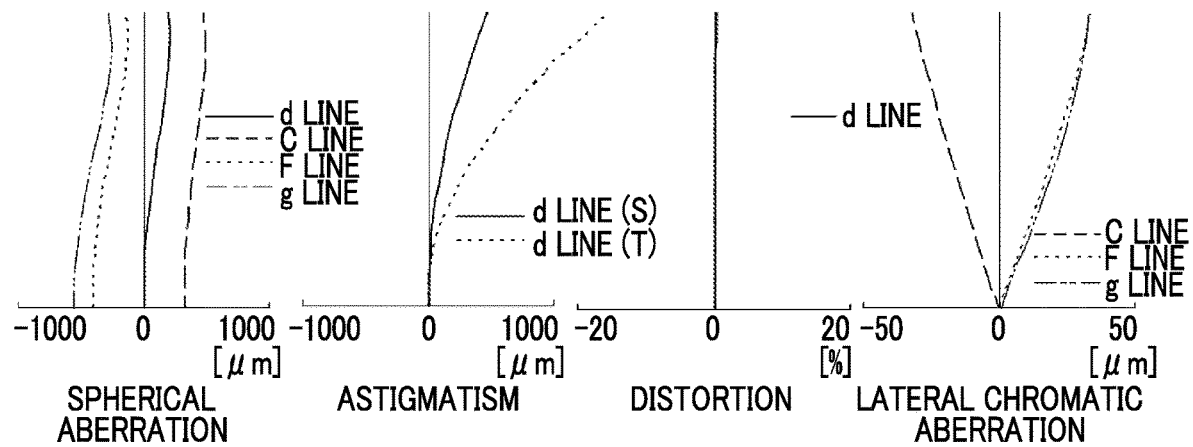

ZOOM LENS AND IMAGING APPARATUS

CROSS-REFERENCE TO RELATED APPLICATIONS

The present application claims priority under 35 U.S.C. § 119 to Japanese Patent Application No. 2018-154925, filed on Aug. 21, 2018. The above application is hereby expressly incorporated by reference, in its entirety, into the present application.

BACKGROUND OF THE INVENTION

1. Field of the Invention

The present invention relates to a zoom lens and an imaging apparatus.

2. Description of the Related Art

In the related art, as zoom lenses used in broadcast cameras, movie imaging cameras, digital cameras, and the like, there is a known type lens in which a focusing group including lens groups for focusing, a zoom group including lens groups for zooming, and a relay group are arranged in order from a position closest to the object side. For example, JP2015-212724A describes a zoom lens including, in order from the object side: a first lens group that includes a lens group for focusing and does not move during zooming; a second lens group that moves during zooming; one or more lens groups that move during zooming; an aperture stop; and an imaging lens group. In addition, JP2017-203916A describes a zoom lens including, in order from the object side: a first lens group that does not move during zooming; and a second lens group that moves during zooming, where a part of or the entirety of the first lens group and a part of the second lens group moves during zooming.

SUMMARY OF THE INVENTION

The zoom lenses used in the cameras are required to have high magnification and high performance. In a case where the magnification is increased in the above-mentioned type, the amount of fluctuation in field curvature during focusing changes in accordance with the zoom range. Thus, It is difficult to achieve high magnification while maintaining high performance by satisfactorily suppressing fluctuation in field curvature during focusing in the entire zoom range.

The lens system described in JP2015-212724A does not adopt a configuration where the focusing lens group, which is closest to the image side and has a negative refractive power, moves in accordance with the zoom position. Thus, it is difficult to achieve both suppression of fluctuation in field curvature during focusing at the zoom position for a middle focal length and correction of spherical aberration at the telephoto end. In the lens system described in JP2017-203916A, suppression of fluctuation in aberrations during focusing at the zoom position for the middle focal length is insufficient.

The present invention has been made in view of the above circumstances. According to an embodiment of the present invention, it is an object to provide a zoom lens, which is capable of achieving high optical performance and high magnification by satisfactorily suppressing fluctuation in field curvature during focusing in the entire zoom range, and an imaging apparatus including the zoom lens.

The specific means for achieving the object includes the following aspects.

<1> A zoom lens consisting of, in order from an object side to an image side: a focusing group that includes a lens group moving during focusing; a zoom group that consists of two or more lens groups moving along an optical axis by changing a distance between lens groups adjacent to each other during zooming; and a subsequent group that has a lens group including a stop at a position closest to the object side, where the focusing group consists of, in order from the object side to the image side, a front focusing group which includes a negative lens and remains stationary with respect to an image plane during zooming and focusing, a middle focusing group which consists of one or two lens groups each moving along the optical axis by changing a distance between lens groups adjacent to each other during focusing and having a positive refractive power, and a rear focusing group which consists of one lens group moving along the optical axis by changing a distance between lens groups adjacent to each other during zooming and focusing and having a negative refractive power, where an amount of movement of the rear focusing group during focusing changes in accordance with a zoom position, and the rear focusing group has a zoom range in which the rear focusing group moves from the object side to the image side during focusing from an object at infinity to a closest object, and where assuming that an amount of movement of the rear focusing group during zooming from a wide-angle end to a telephoto end in a state in which the object at infinity is in focus is DFrinf, an amount of movement of the rear focusing group during focusing from the object at infinity to the closest object at a zoom position where the amount of movement of the rear focusing group is a maximum during focusing from the object at infinity to the closest object is DFr max, and a sign of each amount of movement of the rear focusing group is positive in a case where the rear focusing group moves from the object side to the image side, and is negative in a case where the rear focusing group moves from the image side to the object side, Conditional Expression (1) is satisfied, which is represented by $$0.2 < DFrinf/DFr\,max < 50 \qquad (1).$$

<2> The zoom lens according to <1>, where assuming that a lateral magnification of the rear focusing group in a state in which the object at infinity is in focus is $\beta Fr$, in the entire zoom range, Conditional Expression (2) is satisfied, which is represented by $$0.5 < 1/\beta Fr < 0.995 \qquad (2).$$

<3> The zoom lens according to <1> or <2>, where the front focusing group has a negative refractive power.

<4> The zoom lens according to any one of <1> to <3>, where a sign of the refractive power of the focusing group in a state in which the object at infinity is in focus is positive in the entire zoom range.

<5> The zoom lens according to any one of <1> to <4>, where all the lens groups in the middle focusing group move from the image side to the object side during focusing from an object at infinity to a closest object.

<6> The zoom lens according to any one of <1> to <5>, where a zoom position at which the amount of movement of the rear focusing group is a maximum during focusing from the object at infinity to the closest object is closer to the wide-angle side than the telephoto end.

<7> The zoom lens according to any one of <1> to <6>, where a lens group closest to the object side in the zoom group has a negative refractive power, and moves from the object side to the image side during zooming from the wide-angle end to the telephoto end.

<8> The zoom lens according to any one of <7>, where assuming that a focal length of the lens group closest to the object side in the zoom group is fV1, and a focal length of the rear focusing group is fFr, Conditional Expression (3) is satisfied, which is represented by $$0.001<fV1/fFr<0.4 \qquad (3).$$

<9> The zoom lens according to any one of <1> to <8>, where the rear focusing group consists of one negative lens.

<10> The zoom lens according to any one of <1> to <8>, where the rear focusing group consists of a cemented lens formed by cementing one negative lens and one positive lens.

<11> The zoom lens according to any one of <1> to <10>, where an amount of movement of at least one lens group in the middle focusing group during focusing changes in accordance with the zoom position.

<12> The zoom lens according to any one of <1> to <11>, where among the lens groups in the zoom group, at least one of the lens groups closer to the image side than the lens group closest to the object side moves during focusing, and the amount of movement during focusing changes in accordance with the zoom position.

<13> The zoom lens according to any one of <1> to <11>, where at least one lens group in the subsequent group moves during focusing, and the amount of movement during focusing changes in accordance with the zoom position.

<14> The zoom lens according to <1>, where Conditional Expression (1-1) is satisfied, which is represented by $$0.3<DFrinf/DFr \max<10 \qquad (1-1).$$

<15> The zoom lens according to <2>, where Conditional Expression (2-1) is satisfied, which is represented by $$0.55<1>/\beta Fr<0.995 \qquad (2-1).$$

<16> The zoom lens according to <8>, where Conditional Expression (3-1) is satisfied, which is represented by $$0.002<fV1/fFr<0.3 \qquad (3-1).$$

<17> An imaging apparatus comprising the zoom lens according to any one of <1> to <16>.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In addition, the term "~ group that has a positive refractive power" in the present specification means that the group has a positive refractive power as a whole. Likewise, the "~ group having a negative refractive power" means that the group has a negative refractive power as a whole. The term "a lens having a positive refractive power" and the term "a positive lens" are synonymous. The term "a lens having a negative refractive power" and the term "negative lens" are synonymous. The sign of the refractive power and the surface shape of the lens surface of a lens including an aspheric surface are considered in terms of the paraxial region unless otherwise noted.

The terms "lens group", "front focusing group", "middle focusing group", and "rear focusing group" each are not limited to the configuration consisting of a plurality of lenses, and each may be configured to consist of only one lens. Regarding the term "one lens group", a lens group in which the distance between the groups adjacent to each other in the direction of the optical axis changes during at least one of zooming or focusing is defined as "one lens group". That is, in a case where the lens group is divided by the distance changing during at least one of zooming and focusing, the lens group included in one division is defined as one lens group.

The term "entire zoom range" is defined as a zoom range from the wide-angle end to the telephoto end. The term "zoom position" means, for example, a wide-angle end, a telephoto end, and a zoom state between the wide-angle end and the telephoto end. The term "zoom position for the middle focal length" is not limited to the middle point between the wide-angle end and the telephoto end and may mean an optional zoom position between the wide-angle end and the telephoto end. The phrase "move during focusing" is not limited to a case of moving during focusing at all zoom positions, and means a case of moving during focusing at least one zoom position.

The "focal length" used in a conditional expression is a paraxial focal length. The values used in Conditional Expressions are values on the d line basis. The partial dispersion ratio $\theta gF$ between the g line and the F line of a certain lens is defined by $\theta gF=(Ng-NF)/(NF-NC)$, where Ng, NF, and NC are the refractive indices of the lens at the g line, the F line, and the C line. The "d line", "C line", "F line", and "g line" described in the present specification are emission lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers).

According to an embodiment of the present invention, it is possible to provide a zoom lens, which is capable of achieving high magnification while maintaining high optical performance by satisfactorily suppressing fluctuation in field curvature during focusing in the entire zoom range, and an imaging apparatus including the zoom lens.

BRIEF DESCRIPTION OF THE DRAWINGS

FIG. 2 is a cross-sectional view illustrating a configuration of the zoom lens and rays shown in FIG. 1.

FIG. 11 is a diagram of aberrations of the zoom lens of Example 1 of the present invention in a state in which the object at infinity is in focus.

FIG. 12 is a diagram of aberrations of the zoom lens of Example 1 of the present invention in a state in which the closest object is in focus.

FIG. 13 is a diagram of aberrations of the zoom lens of Example 2 of the present invention in a state in which the object at infinity is in focus.

FIG. 15 is a diagram of aberrations of the zoom lens of Example 3 of the present invention in a state in which the object at infinity is in focus.

FIG. 17 is a diagram of aberrations of the zoom lens of Example 4 of the present invention in a state in which the object at infinity is in focus.

FIG. 18 is a diagram of aberrations of the zoom lens of Example 4 of the present invention in a state in which the closest object is in focus.

FIG. 19 is a diagram of aberrations of the zoom lens of Example 5 of the present invention in a state in which the object at infinity is in focus.

FIG. 21 is a diagram of aberrations of the zoom lens of Example 6 of the present invention in a state in which the object at infinity is in focus.

FIG. 23 is a diagram of aberrations of the zoom lens of Example 7 of the present invention in a state in which the object at infinity is in focus.

FIG. 24 is a diagram of aberrations of the zoom lens of Example 7 of the present invention in a state in which the closest object is in focus.

DESCRIPTION OF THE PREFERRED EMBODIMENTS

Figure 1:
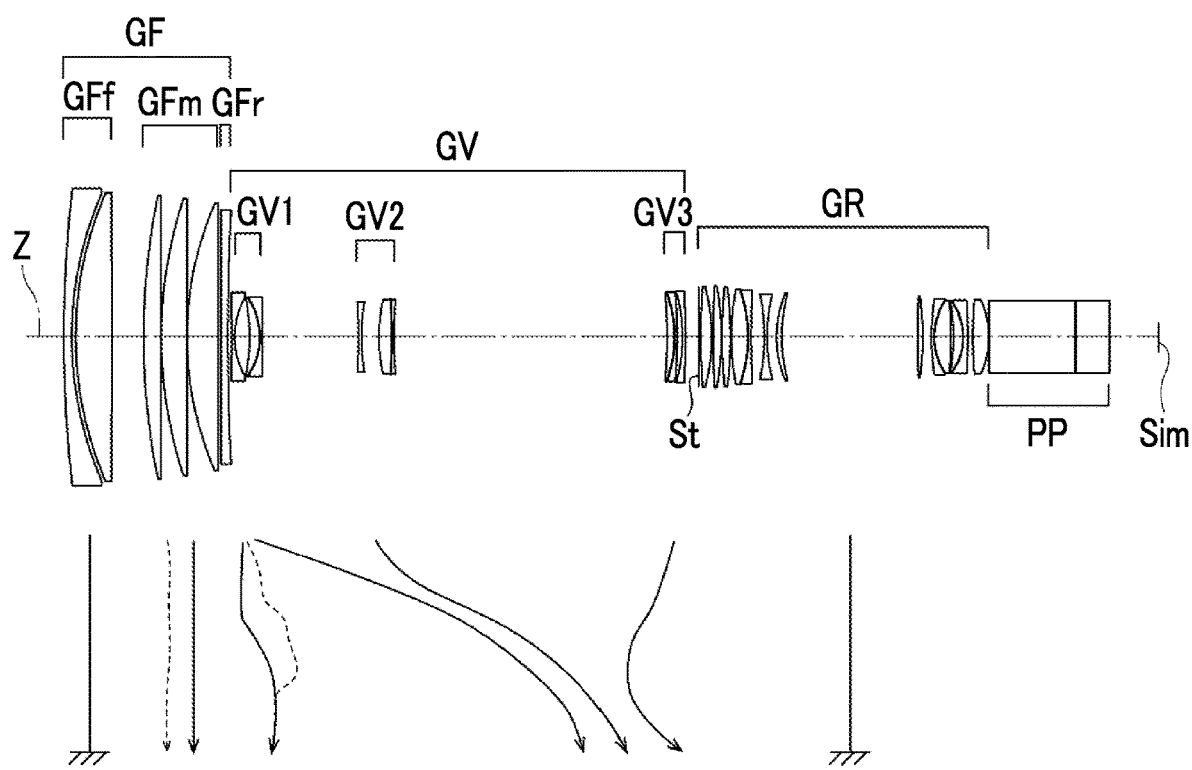
FIG. 1 is a diagram illustrating a cross-sectional view of a configuration of a zoom lens according to an embodiment of the present invention and a movement locus corresponding to the zoom lens of Example 1 of the present invention.

Hereinafter, embodiments of the zoom lens of the present invention will be described in detail with reference to the drawings. FIG. 1 is a cross-sectional view illustrating a configuration and a movement locus of a zoom lens according to an embodiment of the present invention. FIG. 2 is a cross-sectional view illustrating the lens configuration and the rays in each state of the zoom lens. The examples shown in FIGS. 1 and 2 correspond to the zoom lens of Example 1 to be described later. FIGS. 1 and 2 each show a situation where the object at infinity is in focus, the left side thereof is an object side, and the right side thereof is an image side.

FIG. 1 shows the wide-angle end state. In FIG. 1, the movement locus of each lens group during zooming from the wide-angle end to the telephoto end under each lens group moving during zooming and/or focusing is schematically indicated by an arrow. Among the arrows, the solid arrows indicate movement loci in a state in which the object at infinity is in focus, and the dotted arrows indicate movement loci in a state in which the closest object is in focus. Further, in FIG. 1, a symbol which indicates the bottom is shown under each lens group remaining stationary with respect to the image plane Sim during zooming and focusing.

In FIG. 2, the upper part labeled "WIDE-ANGLE END" indicates the wide-angle end state, the middle part labeled "MIDDLE" indicates the middle focal length state, and the lower part labeled "TELEPHOTO END" indicates the telephoto end state. FIG. 2 shows rays including on-axis rays wa and rays with the maximum angle of view wb at the wide-angle end state, on-axis rays ma and rays with the maximum angle of view mb at the middle focal length state, and on-axis rays to and rays with the maximum angle of view tb at the telephoto end state.

Further, FIGS. 1 and 2 show an example in which, assuming that a zoom lens is applied to an imaging apparatus, an optical member PP of which the incident surface and the exit surface are parallel is disposed between the zoom lens and the image plane Sim. The optical member PP is a member assumed to include various filters, a prism, a cover glass, and/or the like. The various filters include, for example, a low pass filter, an infrared cut filter, and a filter that cuts a specific wavelength region. The optical member PP has no refractive power, and the optical member PP may be configured to be omitted. Hereinafter, description will be given mainly with reference to FIG. 1.

The zoom lens of the present invention consists of, in order from the object side to the image side along the optical axis Z: a focusing group GF that includes a lens group moving during focusing; a zoom group GV that consists of two or more lens groups moving along the optical axis Z by changing a distance between lens groups adjacent to each other during zooming; and a subsequent group GR that has a lens group including an aperture stop St at a position closest to the object side. The subsequent group GR is configured such that the lens group closest to the object side in the subsequent group GR is a lens group including the aperture stop St in a case where a lens group, in which the distance in the direction of the optical axis Z between groups adjacent to each other changes during at least one of zooming and focusing, is formed as one lens group.

For example, in the example shown in FIG. 1, the focusing group GF consists of six lenses, the zoom group GV consists of nine lenses, and the subsequent group GR consists of the aperture stop St and thirteen lenses. Further, in the example shown in FIG. 1, the zoom group GV consists of three groups of a first zoom group GV1, a second zoom group GV2, and a third zoom group GV3, and these three groups moves along the optical axis Z by changing the distance between groups adjacent to each other during zooming. However, in the zoom lens of the present invention, the number of lenses constituting each group and the number of lens groups constituting the zoom group GV may be different from those in the example shown in FIG. 1.

By focusing using the group closer to the object side than the zoom group GV, it is possible to suppress the amount of movement of the lens group that moves during focusing. As a result, there is an advantage in achieving both size reduction and high magnification. If in a case of a configuration in which focusing is performed using only the group closer to the image side than the zoom group GV, the amount of movement necessary for focusing on the telephoto side increases as the magnification increases. Thus, it is difficult to achieve both reduction in size and high magnification.

Regarding the zoom group GV, by adopting a configuration in which two or more zoom groups GV are formed, a lens group having the main zoom function and another lens group for performing focus correction during zooming can be provided, and thus each function can be separately assigned to each lens group.

The subsequent group GR can be mainly configured as a group having an imaging function. In the example shown in FIG. 1, the aperture stop St is disposed to be closest to the object side in the subsequent group GR. However, in the zoom lens according to the present invention, the lens group closest to the object side in the subsequent group GR may include the aperture stop St, and the position of the aperture stop St may be different from the example shown in FIG. 1.

It is preferable that the sign of the refractive power of the focusing group GF in a state in which the object at infinity is in focus is positive in the entire zoom range. In such a case, the height of the on-axis rays of the zoom group GV can be reduced, and it becomes easy to correct spherical aberration in the entire zoom range. As a result, there is an advantage in achieving high magnification.

The focusing group GF consists of, in order from the object side to the image side, a front focusing group GFf, a middle focusing group GFm, and a rear focusing group GFr. The front focusing group GFf includes a negative lens and remains stationary with respect to the image plane Sim during zooming and focusing. The middle focusing group GFm consists of one or two lens groups each moving along the optical axis Z by changing a distance between lens groups adjacent to each other during focusing and having a positive refractive power. The rear focusing group GFr consists of one lens group moving along the optical axis Z by changing a distance between lens groups adjacent to each other during zooming and focusing and having a negative refractive power.

By providing the negative lens in the front focusing group GFf, there is an advantage in achieving wide angle, and there is an advantage in correcting lateral chromatic aberration at the wide-angle end, spherical aberration at the telephoto end, and longitudinal chromatic aberration at the telephoto end. By adopting a configuration in which the front group GFf does not move with respect to the image plane Sim during zooming and focusing, the total length of the lens system (the distance on the optical axis between the lens surface closest to the object side and the image plane Sim) during zooming and focusing is constant, and fluctuation in barycenter of the lens system can be reduced. Thus, the convenience at the time of imaging can be enhanced.

It is preferable that the front focusing group GFf has a negative refractive power. In such a case, there is an advantage in achieving wide angle.

The middle focusing group GFm is able to have the main focusing function by being configured to consist of a lens group having a positive refractive power that moves during focusing.

It is preferable that all the lens groups in the middle focusing group GFm move from the image side to the object side during focusing from an object at infinity to a closest object. In such a case, the middle focusing group GFm is able to have the main focusing function.

The lens group in the middle focusing group GFm may move during zooming, or may remain stationary with respect to the image plane Sim during zooming. In a case where the lens group in the middle focusing group GFm moves during zooming, there is an advantage in suppressing fluctuation in aberrations during zooming. In a case where the lens group in the middle focusing group GFm remains stationary with respect to the image plane Sim during zooming, there is an advantage in simplifying the mechanism for driving the lens group.

The rear focusing group GFr has a negative refractive power, and moves during zooming and focusing. An amount of movement of the rear focusing group GFr during focusing changes in accordance with a zoom position, and the rear focusing group GFr moves from the object side to the image side during focusing from the object at infinity to the closest object.

For example, regarding the movement locus of the rear focusing group GFr in FIG. 1, there is a zoom range where the movement locus in a state in which the closest object indicated by the dotted line is in focus is positioned to be closer to the image side as compared with the movement locus in a state where the object at infinity indicated by the solid line is in focus. In such a zoom range, the rear focusing group GFr moves from the object side to the image side during focusing from the object at infinity to the closest object.

By moving the rear focusing group GFr during zooming, it is possible to suppress fluctuation in field curvature during zooming in the zoom range from the wide-angle end to the zoom position for the middle focal length. If the rear focusing group GFr is configured not to move during zooming, it is difficult to achieve both suppression of field curvature on the wide-angle side and suppression of spherical aberration on the telephoto side. As a result, it is difficult to achieve high magnification. In addition, by adopting a configuration in which the rear focusing group GFr moves from the object side to the image side during focusing from the object at infinity to the closest object at the zoom position for the middle focal length, it becomes easy to suppress fluctuation in field curvature during focusing in the entire zoom range. Consequently, by adopting the above configuration of the rear focusing group GFr, it is possible to suppress fluctuation in aberrations during zooming and focusing. In particular, it is possible to suppress fluctuation in field curvature in the zoom range from the wide-angle end to the zoom position for the middle focal length.

Figure 3A:
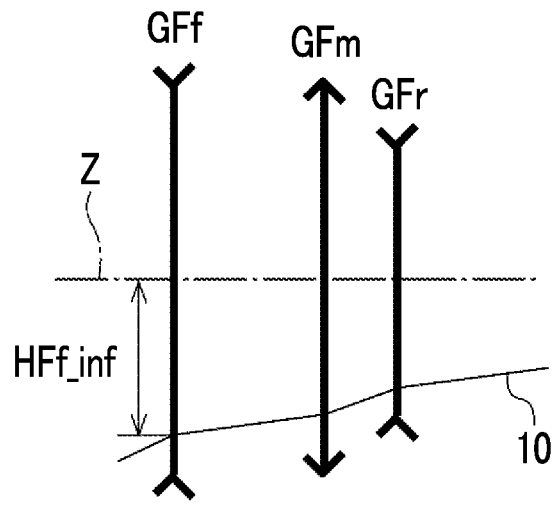
FIGS. 3A to 3C are conceptual views each illustrating changes in heights of off-axis principal rays in a focusing group.
Figure 3B:
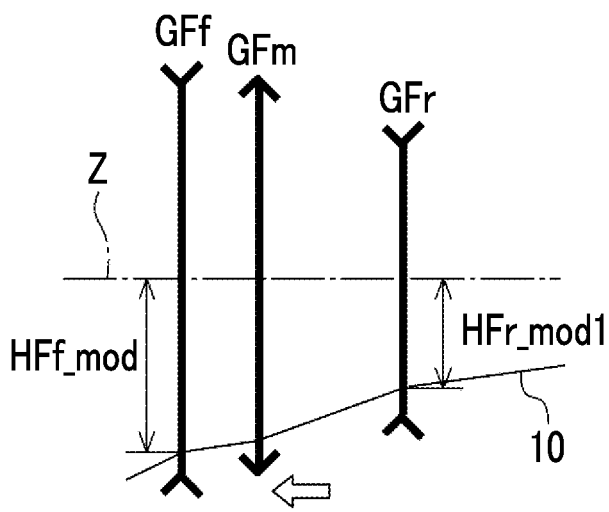
Figure 3C:
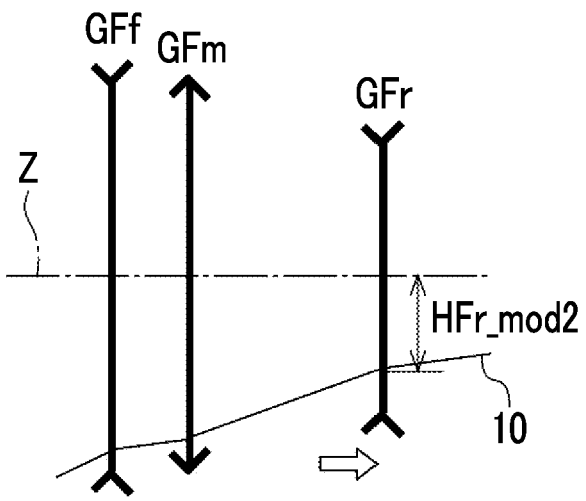

Here, the suppression of the fluctuation in aberrations in the rear focusing group GFr will be described with reference to FIGS. 3A to 3C. FIGS. 3A to 3C are conceptual diagrams illustrating changes in heights of the off-axis principal rays 10 in the focusing group GF. FIGS. 3A to 3C conceptually illustrate the front focusing group GFf, the middle focusing group GFm, and the rear focusing group GFr, where the left side is the object side and the right side is the image side. FIGS. 3A to 3C each show a state at the zoom position for the middle focal length where the off-axis rays become high.

FIG. 3A shows a state in which the object at infinity is in focus. FIG. 3B shows a state in which the middle focusing group GFm brings the closest object into focus by moving to the object side from the state of FIG. 3A. During focusing from the object at infinity to the closest object, the height of the off-axis principal ray 10 passing through the front focusing group GFf closest to the object side changes. In a general high-magnification zoom lens, in the zoom range from the wide-angle end to the zoom position for the middle focal length, a height HFf_mod of the off-axis principal ray 10, which passes through the front focusing group GFf in a state in which the closest object is in focus, is higher than the height HFf_inf of the off-axis principal ray 10 which passes through the front focusing group GFf in a state in which the object at infinity is in focus. That is, HFf_inf<HFf_mod.

The lens group, which has the highest off-axis principal ray 10 at the zoom position for the middle focal length where the off-axis ray is high, is the front focusing group GFf. In the configuration in which the front focusing group GFf includes a negative lens as in the zoom lens of the present invention, by increasing the ray height in the front focusing group GFf during focusing from the object at infinity to the closest object, the negative refractive power has a great effect on fluctuation in field curvature, such that the fluctuation in field curvature is excessive.

Then, during focusing from the object at infinity to the closest object, in a case where the rear focusing group GFr moves to the image side as shown in FIG. 3C, a height HFr_mod2 of the off-axis principal ray 10, which passes through the rear focusing group GFr after the movement, can be set to be lower than a height HFr_mod1 of the off-axis principal ray 10 which passes through the rear focusing group GFr. That is, HFr_mod2<HFr_mod1 can be set. Since the rear focusing group GFr is a lens group having a negative refractive power, in a case where the height of the off-axis principal ray 10 passing through the rear focusing group GFr becomes low, the effect of the negative refractive power becomes weak. Thereby, it is possible to suppress fluctuation in field curvature during focusing.

It is preferable that the zoom position, at which the amount of movement of the rear focusing group GFr is the maximum during focusing from the object at infinity to the closest object, is closer to the wide-angle side than the telephoto end. In such a case, it is possible to effectively suppress fluctuation in field curvature during focusing at the zoom position for the middle focal length and fluctuation in spherical aberration during focusing at the telephoto end.

In the zoom lens of the present invention, assuming that an amount of movement of the rear focusing group GFr during zooming from the wide-angle end to the telephoto end in a state in which the object at infinity is in focus is DFrinf, an amount of movement of the rear focusing group GFr during focusing from the object at infinity to the closest object at a zoom position where the amount of movement of the rear focusing group GFr is the maximum during focusing from the object at infinity to the closest object is DFr max, and a sign of each amount of movement of the rear focusing group GFr is positive in a case where the rear focusing group GFr moves from the object side to the image side, and is negative in a case where the rear focusing group GFr moves from the image side to the object side, Conditional Expression (1) is satisfied.

$$0.2 < DFrinf/DFr\max < 50 \tag{1}$$

Figure 4:
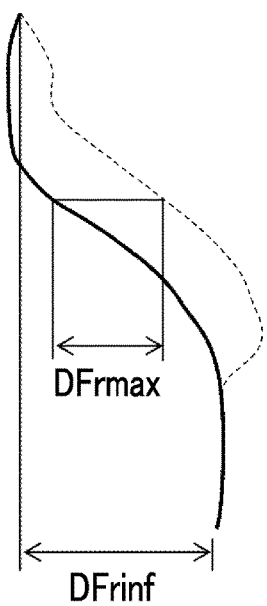
FIG. 4 is a diagram illustrating an example of DFrinf and DFr max of Conditional Expression (1).

FIG. 4 shows, as an example, a movement locus during zooming from the wide-angle end to the telephoto end of the rear focusing group GFr and DFrinf and DFr max in this locus. In FIG. 4, the solid line indicates the movement locus during zooming in the state where the object at infinity is in focus, the dotted line indicates the movement locus during zooming in the state where the closest object is in focus, and in any case, the upper part shows a state at the wide-angle end, and the lower part shows a state at the telephoto end.

By not allowing the result of Conditional Expression (1) to be equal to or less than the lower limit, the amount of movement of the rear focusing group GFr during zooming can be ensured, and it becomes easy to suppress fluctuation in field curvature at the zoom position for the middle focal length. Alternatively, since the amount of movement of the rear focusing group GFr during focusing is prevented from becoming excessively large, the effect of suppressing fluctuation in aberrations during focusing by the movement of the rear focusing group GFr can be prevented from becoming excessive, and fluctuation in aberrations can be appropriately suppressed. By not allowing the result of Conditional Expression (1) to be equal to or greater than the upper limit, it is possible to ensure the amount of movement of the rear focusing group GFr during focusing, and to appropriately obtain the effect of suppressing fluctuation in aberrations during focusing. Alternatively, the amount of movement of the rear focusing group GFr during zooming can be suppressed, and the rear focusing group GFr can be prevented from being excessively far from the middle focusing group GFm on the telephoto side. Thus, it is possible to satisfactorily correct spherical aberration. In addition, in a case of a configuration in which Conditional Expression (1-1) is satisfied, it is possible to obtain more favorable characteristics. In a case of a configuration in which Conditional Expression (1-2) is satisfied, it is possible to obtain further more favorable characteristics.

$$0.3 < DFrinf/DFr\max < 10 \tag{1-1}$$

$$0.4 < DFrinf/DFr\max < 7 \tag{1-2}$$

Further, assuming that a lateral magnification of the rear focusing group GFr in a state in which the object at infinity is in focus is βFr, in the entire zoom range, it is preferable to satisfy Conditional Expression (2). By not allowing the result of Conditional Expression (2) to be equal to or less than the lower limit, the negative refractive power of the rear focusing group GFr is prevented from becoming excessively strong. Thus, the effect of suppressing fluctuation in field curvature during zooming and during focusing can be prevented from becoming excessive, and the fluctuation can be appropriately suppressed. In addition, it becomes easy to suppress chromatic aberration occurring in the rear focusing group GFr. By not allowing the result of Conditional Expression (2) to be equal to or greater than the upper limit, the negative refractive power of the rear focusing group GFr is prevented from becoming excessively weak. As a result, the effect of suppressing fluctuation in field curvature during zooming and during focusing can be satisfactorily ensured. Alternatively, since the amount of movement of the rear focusing group GFr necessary for aberration correction during zooming and focusing is prevented from becoming excessively large, it is possible to avoid interference with lens groups adjacent to each other. In addition, in a case of a configuration in which Conditional Expression (2-1) is satisfied, it is possible to obtain more favorable characteristics. In a case of a configuration in which Conditional Expression (2-2) is satisfied, it is possible to obtain further more favorable characteristics.

$$0.5 < 1/\beta Fr < 0.995 \tag{2}$$

$$0.55 < 1/\beta Fr < 0.995 \tag{2-1}$$

$$0.6 < 1/\beta Fr < 0.98 \tag{2-2}$$

It is preferable that a lens group closest to the object side in the zoom group GV has a negative refractive power and moves from the object side to the image side during zooming from the wide-angle end to the telephoto end. Since the lens group closest to the object side in the zoom group GV has a negative refractive power, the lens group is able to have the main zoom function. Further, since the lens group moves to the image side during zooming from the wide-angle end to the telephoto end, reduction in zoom ratio on the telephoto side can be prevented. As a result, there is an advantage in achieving high magnification. Furthermore, a moving space for focusing of the rear focusing group GFr can be ensured. As a result, there are advantages in achieving reduction in size and high magnification and suppressing fluctuation in aberrations.

A lens group closest to the object side in the zoom group GV has a negative refractive power, and moves from the object side to the image side during zooming from the wide-angle end to the telephoto end. In such a configuration, assuming that a focal length of the lens group closest to the object side in the zoom group GV is fV1, and a focal length of the rear focusing group GFr is fFr, it is preferable to satisfy Conditional Expression (3). By not allowing the result of Conditional Expression (3) to be equal to or less than the lower limit, the negative refractive power of the rear focusing group GFr is prevented from becoming excessively weak. As a result, it is possible to ensure the effect of suppressing fluctuation in field curvature through the rear focusing group GFr during zooming and during focusing. Alternatively, since the refractive power of the lens group closest to the object side in the zoom group GV is prevented from becoming excessively strong, it becomes easy to suppress fluctuation in spherical aberration during zooming. By not allowing the result of Conditional Expression (3) to be equal to or greater than the upper limit, the negative refractive power of the rear focusing group GFr is prevented from becoming excessively strong. As a result, the effect of suppressing fluctuation in field curvature through the rear focusing group GFr during zooming and during focusing is prevented from becoming excessive, and the fluctuation can be appropriately suppressed. In addition, it becomes easy to suppress chromatic aberration occurring in the rear focusing group GFr. Alternatively, since the refractive power of the lens group closest to the object side in the zoom group GV can be ensured, it becomes easy to achieve both high magnification and reduction in size. In addition, in a case of a configuration in which Conditional Expression (3-1) is satisfied, it is possible to obtain more favorable characteristics. In a case of a configuration in which Conditional Expression (3-2) is satisfied, it is possible to obtain further more favorable characteristics.

$$0.001 < fV1/fFr < 0.4 \quad (3)$$

$$0.002 < fV1/fFr < 0.3 \quad (3\text{-}1)$$

$$0.003 < fV1/fFr < 0.2 \quad (3\text{-}2)$$

The rear focusing group GFr is configured such that the amount of movement thereof during focusing changes in accordance with the zoom position. However, another group may be configured such that the amount of movement thereof during focusing changes in accordance with the zoom position. For example, an amount of movement of at least one lens group in the middle focusing group GFm during focusing may change in accordance with the zoom position. In such a case, it is possible to correct fluctuation in focal position due to the movement of the rear focusing group GFr through the lens group of the middle focusing group GFm. In a case of a configuration in which only one lens group in each of the rear focusing group GFr and the middle focus group GFm moves during focusing, the number of lens groups moving during focusing can be reduced. As a result, there are advantages in achieving simplification of the mechanism and reduction in size of the apparatus.

Further, among the lens groups in the zoom group GV, at least one of the lens groups closer to the image side than the lens group closest to the object may move during focusing, and the amount of movement during focusing may change in accordance with the zoom position. In such a case, it is possible to correct fluctuation in focal position due to the movement of the rear focusing group GFr through the lens group of the zoom group GV. By using a part of the lens groups of the zoom group GV having a smaller lens diameter than the focusing group GF in focusing, it is possible to reduce the load of driving means for driving the lens group during zooming and focusing.

Further, at least one lens group in the subsequent group GR may move during focusing, and the amount of movement during focusing may change in accordance with the zoom position. In such a case, it is possible to correct fluctuation in focal position due to the movement of the rear focusing group GFr through the lens group of the subsequent group GR. By using a part of the lens groups of the subsequent group GR having a smaller lens diameter than the focusing group GF in focusing, it is possible to reduce the load of driving means for driving the lens group during zooming and focusing. Furthermore the amount of movement can be reduced.

Each group in the focusing group GF can adopt, for example, configurations described below. The front focusing group GFf can be configured to consist of two lenses of a negative lens and a positive lens. In such a case, there is an advantage in correcting chromatic aberration. More specifically, the front focusing group GFf can be configured to consist of two lenses of a negative lens and a positive lens in order from the object side to the image side. In such a case, there are advantages in achieving wide angle and correcting chromatic aberration.

The middle focusing group GFm can be configured to consist of three positive lenses. In such a case, the positive refractive power can be divided to three positive lenses. As a result, there is an advantage in correcting spherical aberration.

The rear focusing group GFr may be configured to consist of one negative lens. In such a case, it is possible to ensure a large moving space for zooming of the lens group closest to the object side in the zoom group GV. As a result, there is an advantage in achieving high magnification. In a case where the lens group closest to the object side in the zoom group GV is a lens group having the main zoom function, there is an advantage in higher magnification.

Alternatively, the rear focusing group GFr may be configured to be a cemented lens formed by cementing one negative lens and one positive lens. In such a case, by providing the positive lens and the negative lens, it becomes easy to correct longitudinal chromatic aberration on the telephoto side. Further, by using the cemented lens, the space can be reduced, and a large movement space for the lens group closest to the object in the zoom group GV can be ensured. As a result, there is an advantage in achieving high magnification.

The zoom group GV and the subsequent group GR can adopt, for example, configurations described below. The zoom group GV can be configured to consist of a lens group having two negative refractive powers, and the subsequent group GR can be configured to have a positive refractive power. In such a case, it becomes easy to achieve reduction in size and high magnification and suppress fluctuation in various aberrations during zooming. In particular, there is an advantage in suppressing fluctuation in field curvature during zooming.

Alternatively, the zoom group GV can be configured to consist of a lens group having three negative refractive powers, and the subsequent group GR can be configured to have a positive refractive power. In such a case, it becomes easy to achieve reduction in size, high magnification, and suppression of fluctuation in various aberrations during zooming. In particular, there are advantages in suppressing fluctuation in field curvature and fluctuation in spherical aberration during zooming.

Alternatively, the zoom group GV can be configured to consist of, in order from the object side to the image side, a lens group having a negative refractive power and two lens groups having positive refractive powers, and the subsequent group GR can be configured to have a positive refractive power. In such a case, it becomes easy to achieve reduction in size, high magnification, and suppression of fluctuation in various aberrations during zooming. In particular, there is an advantage in suppressing fluctuation in spherical aberration during zooming.

The above description has been made of the case where the rear focusing group GFr moves during zooming and focusing. However, the rear focusing group GFr may be configured to move along the optical axis Z in order to correct fluctuation in field curvature due to the manufacturing error. Further, the rear focusing group GFr may be configured to move along the optical axis Z in accordance with the temperature change and/or the aperture value of the aperture stop St.

The above-mentioned preferred configurations and available configurations may be optional combinations, and it is preferable to selectively adopt the configurations in accordance with required specification. According to the technology of the present invention, it is possible to realize a zoom lens capable of achieving high magnification while maintaining favorable optical performance by satisfactorily suppressing fluctuation in field curvature during focusing in the entire zoom range. The term "high magnification" described herein means that the zoom ratio is 20 times or more.

Next, numerical examples of the zoom lens of the present invention will be described.

Example 1

FIG. 1 shows a cross-sectional view illustrating the configuration of the zoom lens of Example 1 and a movement locus. The illustration method and configuration thereof are as described above. Therefore, repeated description is partially omitted herein. The zoom lens of Embodiment 1 consists of, in order from the object side to the image side, a focusing group GF, a zoom group GV, and a subsequent group GR. The focusing group GF consists of, in order from the object side to the image side, a front focusing group GFf, a middle focusing group GFm, and a rear focusing group GFr. The front focusing group GFf remains stationary with respect to the image plane Sim during zooming and focusing. The middle focusing group GFm consists of one lens group, and moves along the optical axis Z during zooming and focusing. The rear focusing group GFr moves along the optical axis Z during zooming and focusing. The zoom group GV consists of, in order from the object side to the image side, three lens groups of a first zoom group GV1, a second zoom group GV2, and a third zoom group GV3. The three groups move along the optical axis Z by changing the distances between the groups during zooming. The subsequent group GR remains stationary with respect to the image plane Sim during zooming and focusing.

Table 1A and Table 1B show basic lens data of the zoom lens of Example 1, Table 2 shows a specification, Table 3 shows the distance between the groups, and Table 4 shows the amount of movement of the group moving during focusing. Tables 1A and 1B show the basic lens data which is divided into two tables in order to prevent one table from becoming long. In Tables 1A and 1B, the column of Sn shows surface numbers. The surface closest to the object side is the first surface, and the surface numbers increase one by one toward the image side. The column of R shows radii of curvature of the respective surfaces. The column of D shows surface distances on the optical axis Z between the respective surfaces and the surfaces adjacent to the image side. The column of Nd shows a refractive index of each constituent element at the d line, the column of vd shows an Abbe number of each constituent element at the d line, and the column of θgF shows a partial dispersion ratio of each constituent element between the g line and the F line. Further, in order to facilitate understanding, the reference sign of each group is shown in a box for each group in the rightmost column.

In Tables 1A and 1B, the sign of the radius of curvature of the surface convex toward the object side is positive and the sign of the radius of curvature of the surface convex toward the image side is negative. Table 1B also shows the aperture stop St and the optical member PP, and in a place of a surface number of a surface corresponding to the aperture stop St, the surface number and a term of (St) are noted. A value at the bottom place of D in Table 1B indicates a distance between the image plane Sim and the surface closest to the image side in the table. In Tables 1A and 1B, the variable surface distances are referenced by the reference signs DD[ ], and are written into places of D, where object side surface numbers of distances are noted in [ ].

In the range of Table 2, values of the zoom ratio Zr, the focal length f, the F number FNo, and the maximum total angle of view 2ω are based on the d line. (°) in the place of 2ω indicates that the unit thereof is a degree. In Table 2, the values in the wide-angle end state, the middle focal length state, and the telephoto end state are shown in the columns denoted as "Wide-Angle End", "Middle", and "Telephoto End", respectively. The table of the specification shows the respective values thereof in a state in which the object at infinity is in focus.

In Table 3, the values of the respective variable surface distances in the state where the object at infinity is in focus are shown in the upper table, and the values of the respective variable surface distances in a state where the closest object is in focus at the object distance are shown in the lower table. In Table 3, the values in the wide-angle end state, the middle focal length state, and the telephoto end state are shown in the columns denoted as the wide-angle end, the middle, and the telephoto end, respectively. In the data of Example 1, the object distance of the closest object is set to 2.8 m (meters).

Table 4 shows the amounts of movement of the respective groups during focusing from the object at infinity to the closest object. Regarding the positive and negative signs of the amounts of movement, each sign is positive in a case of moving from the object side to the image side, and negative in a case of moving from the image side to the object side. In Table 4, the amount of movements of the middle focusing group GFm and the rear focusing group GFr are shown in the columns denoted as "GFm" and "GFr", respectively.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1A

Example 1 Basic Lens Data

| Sn | R | D | Nd | vd | θgF | |
|---|---|---|---|---|---|---|
| 1 | 536.26299 | 3.000 | 1.83481 | 42.74 | 0.5649 | GFf |
| 2 | 145.10949 | 1.500 | | | | |
| 3 | 145.31454 | 13.778 | 1.43387 | 95.18 | 0.5373 | |
| 4 | −16443.96163 | DD[4] | | | | |
| 5 | 282.29583 | 6.699 | 1.43387 | 95.18 | 0.5373 | GFm |
| 6 | 4131608.75756 | 0.120 | | | | |
| 7 | 179.37816 | 9.688 | 1.43387 | 95.18 | 0.5373 | |
| 8 | −4906488.65949 | 0.120 | | | | |
| 9 | 134.16532 | 11.869 | 1.43387 | 95.18 | 0.5373 | |
| 10 | 2777777.77778 | DD[10] | | | | |
| 11 | ∞ | 2.550 | 1.43875 | 94.66 | 0.5340 | GFr |
| 12 | 1011.80105 | DD[12] | | | | |
| 13 | −1241.01658 | 1.100 | 1.88300 | 40.76 | 0.5668 | GV1 |
| 14 | 31.53861 | 5.723 | | | | |
| 15 | −74.91246 | 3.939 | 1.89286 | 20.36 | 0.6394 | |
| 16 | −26.95121 | 0.970 | 1.77891 | 50.11 | 0.5509 | |
| 17 | −692.82440 | DD[17] | | | | |
| 18 | −271.50303 | 1.200 | 1.89069 | 38.93 | 0.5732 | GV2 |
| 19 | 82.94205 | 6.618 | | | | |
| 20 | 65.79185 | 5.010 | 1.70593 | 29.70 | 0.6046 | |
| 21 | −202.05069 | 0.960 | 1.95169 | 32.56 | 0.5895 | |
| 22 | 375.91532 | DD[22] | | | | |
| 23 | −181.92824 | 2.931 | 1.86694 | 21.67 | 0.6331 | GV3 |
| 24 | −49.33093 | 0.960 | 1.90000 | 36.66 | 0.5792 | |
| 25 | −180.40603 | 2.007 | | | | |
| 26 | −65.96601 | 1.250 | 1.88300 | 40.76 | 0.5668 | |
| 27 | −253.84368 | DD[27] | | | | |

TABLE 1B

Example 1 Basic Lens Data

| Sn | R | D | Nd | vd | θgF | |
|---|---|---|---|---|---|---|
| 28 (St) | ∞ | 0.746 | | | | GR |
| 29 | 252.85135 | 4.139 | 1.74402 | 54.11 | 0.5559 | |
| 30 | −79.87511 | 0.621 | | | | |
| 31 | 325.79906 | 3.092 | 1.57789 | 71.15 | 0.5432 | |
| 32 | −110.18324 | 0.306 | | | | |
| 33 | 201.24582 | 3.199 | 1.72044 | 56.63 | 0.5466 | |
| 34 | −162.33564 | 0.348 | | | | |
| 35 | 96.03836 | 6.337 | 1.59005 | 69.09 | 0.5440 | |
| 36 | −59.05046 | 1.280 | 1.84861 | 23.30 | 0.6240 | |
| 37 | 600.83826 | 4.996 | | | | |
| 38 | −84.41332 | 1.000 | 1.81197 | 46.80 | 0.5570 | |
| 39 | 62.94370 | 3.644 | | | | |
| 40 | 43.62913 | 2.078 | 1.89999 | 20.00 | 0.6419 | |
| 41 | 66.82517 | 52.194 | | | | |
| 42 | 310.33041 | 1.960 | 1.84188 | 31.66 | 0.5955 | |
| 43 | −104.99365 | 3.356 | | | | |
| 44 | 87.34371 | 1.050 | 1.88310 | 38.85 | 0.5736 | |
| 45 | 25.96553 | 6.386 | 1.63246 | 63.77 | 0.5421 | |
| 46 | −159.67834 | 1.000 | | | | |
| 47 | −74.88038 | 3.683 | 1.48749 | 70.24 | 0.5301 | |
| 48 | −23.86444 | 1.692 | 1.78943 | 47.13 | 0.5571 | |
| 49 | −249.80868 | 2.063 | | | | |
| 50 | 187.61999 | 6.114 | 1.48749 | 70.24 | 0.5301 | |

TABLE 1B-continued

Example 1 Basic Lens Data

| Sn | R | D | Nd | vd | θgF |
|---|---|---|---|---|---|
| 51 | −34.58284 | 0.000 | | | |
| 52 | ∞ | 33.000 | 1.60859 | 46.44 | 0.5666 |
| 53 | ∞ | 13.200 | 1.51633 | 64.05 | 0.5346 |
| 54 | ∞ | 18.591 | | | |

TABLE 2

Example 1 Specification

| | Wide-Angle End | Middle | Telephoto End |
|---|---|---|---|
| Zr | 1.00 | 3.84 | 40.50 |
| f | 10.003 | 38.383 | 405.111 |
| FNo. | 2.06 | 2.06 | 3.85 |
| 2ω(°) | 60.36 | 15.90 | 1.54 |

TABLE 3

Example 1 Distance between Groups

| | Wide-Angle End | Middle | Telephoto End |
|---|---|---|---|
| | State of Focusing on Object at Infinity | | |
| DD[4] | 12.193 | 12.143 | 12.193 |
| DD[10] | 1.200 | 0.845 | 12.178 |
| DD[12] | 1.500 | 81.385 | 121.772 |
| DD[17] | 36.985 | 1.350 | 4.891 |
| DD[22] | 104.216 | 48.276 | 8.672 |
| DD[27] | 5.008 | 17.103 | 1.395 |
| | State of Focusing on Closest Object (at 2.8 m) | | |
| DD[4] | 1.693 | 3.693 | 1.651 |
| DD[10] | 12.055 | 25.309 | 22.772 |
| DD[12] | 1.145 | 65.371 | 121.721 |
| DD[17] | 36.985 | 1.350 | 4.891 |
| DD[22] | 104.216 | 48.276 | 8.672 |
| DD[27] | 5.008 | 17.103 | 1.395 |

TABLE 4

Example 1 Amount of Movement During Focusing

| | Wide-Angle End | Middle | Telephoto End |
|---|---|---|---|
| GFm | −10.500 | −8.450 | −10.542 |
| GFr | 0.355 | 16.014 | 0.052 |

FIG. 11 shows aberration diagrams in a state where an object at infinity is brought into focus through the zoom lens of Example 1. In FIG. 11, in order from the left side, spherical aberration, astigmatism, distortion, and lateral chromatic aberration are shown. In FIG. 11, the upper part labeled "INFINITY, WIDE-ANGLE END" shows aberrations in the wide-angle end state, the middle part labeled "INFINITY, MIDDLE" shows aberrations in the middle focal length state, and the lower part labeled "INFINITY, TELEPHOTO END" shows aberrations in the telephoto end state. In the spherical aberration diagram, aberrations at the d line, the C line, the F line, and the g line are indicated by the solid line, the long dashed line, the short dashed line, and the chain double-dashed line, respectively. In the astigmatism diagram, aberration in the sagittal direction at the d line is indicated by the solid line, and aberration in the tangential direction at the d line is indicated by the short dashed line.

In the distortion diagram, aberration at the d line is indicated by the solid line. In the lateral chromatic aberration diagram, aberrations at the C line, the F line, and the g line are respectively indicated by the long dashed line, the short dashed line, and the chain double-dashed line. In the spherical aberration diagram, FNo. indicates an F number. In the other aberration diagrams, ω indicates a half angle of view.

FIG. 12 is a diagram of aberrations of the zoom lens of Example 1 in a state in which the closest object is in focus at the object distance of 2.8 m (meters). In FIG. 12, the upper part labeled "DISTANCE OF 2.8 m, WIDE-ANGLE END" shows aberrations in the wide-angle end state, the middle part labeled "DISTANCE OF 2.8 m, MIDDLE" shows aberrations in the middle focal length state, and the lower part labeled "DISTANCE OF 2.8 m, TELEPHOTO END" shows aberrations in the telephoto end state. The other notations are the same as those in FIG. 11.

Symbols, meanings, description methods, and illustration methods of the respective data pieces according to Example 1 are the same as those in the following examples unless otherwise noted. Therefore, in the following description, repeated description will be omitted.

Example 2

Figure 5:
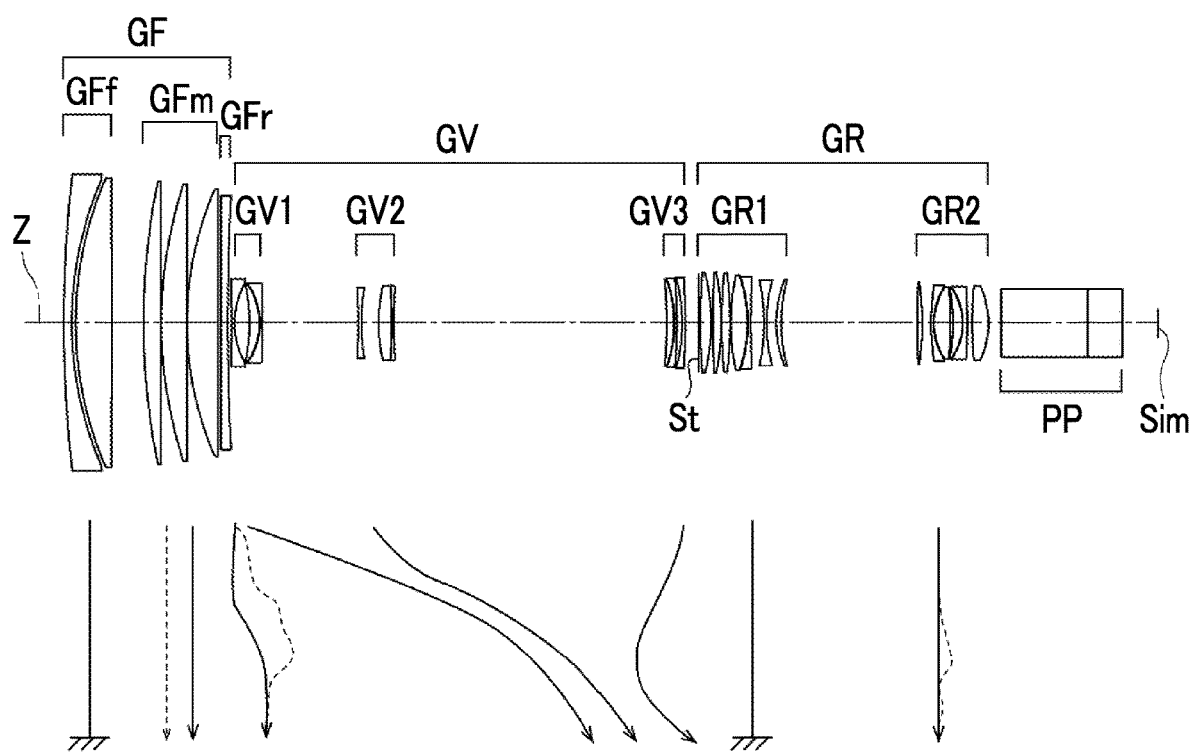
FIG. 5 is a diagram illustrating a cross-sectional view of a configuration of a zoom lens according to Example 2 of the present invention and a movement locus thereof.

FIG. 5 shows a cross-sectional view illustrating a configuration of the zoom lens of Example 2 and a movement locus. The zoom lens of Embodiment 2 consists of, in order from the object side to the image side, a focusing group GF, a zoom group GV, and a subsequent group GR. The focusing group GF consists of, in order from the object side to the image side, a front focusing group GFf, a middle focusing group GFm, and a rear focusing group GFr. The front focusing group GFf remains stationary with respect to the image plane Sim during zooming and focusing. The middle focusing group GFm remains stationary with respect to the image plane Sim during zooming, and moves along the optical axis Z during focusing. The rear focusing group GFr consists of one lens group, and moves along the optical axis Z during zooming and focusing. The zoom group GV consists of, in order from the object side to the image side, three lens groups of a first zoom group GV1, a second zoom group GV2, and a third zoom group GV3. The three groups move along the optical axis Z by changing the distances between the groups during zooming. The subsequent group GR consists of a first subsequent group GR1 and a second subsequent group GR2. The first subsequent group GR1 remains stationary with respect to the image plane Sim during zooming and focusing. The second subsequent group GR2 moves along the optical axis Z during zooming and focusing.

Figure 14:
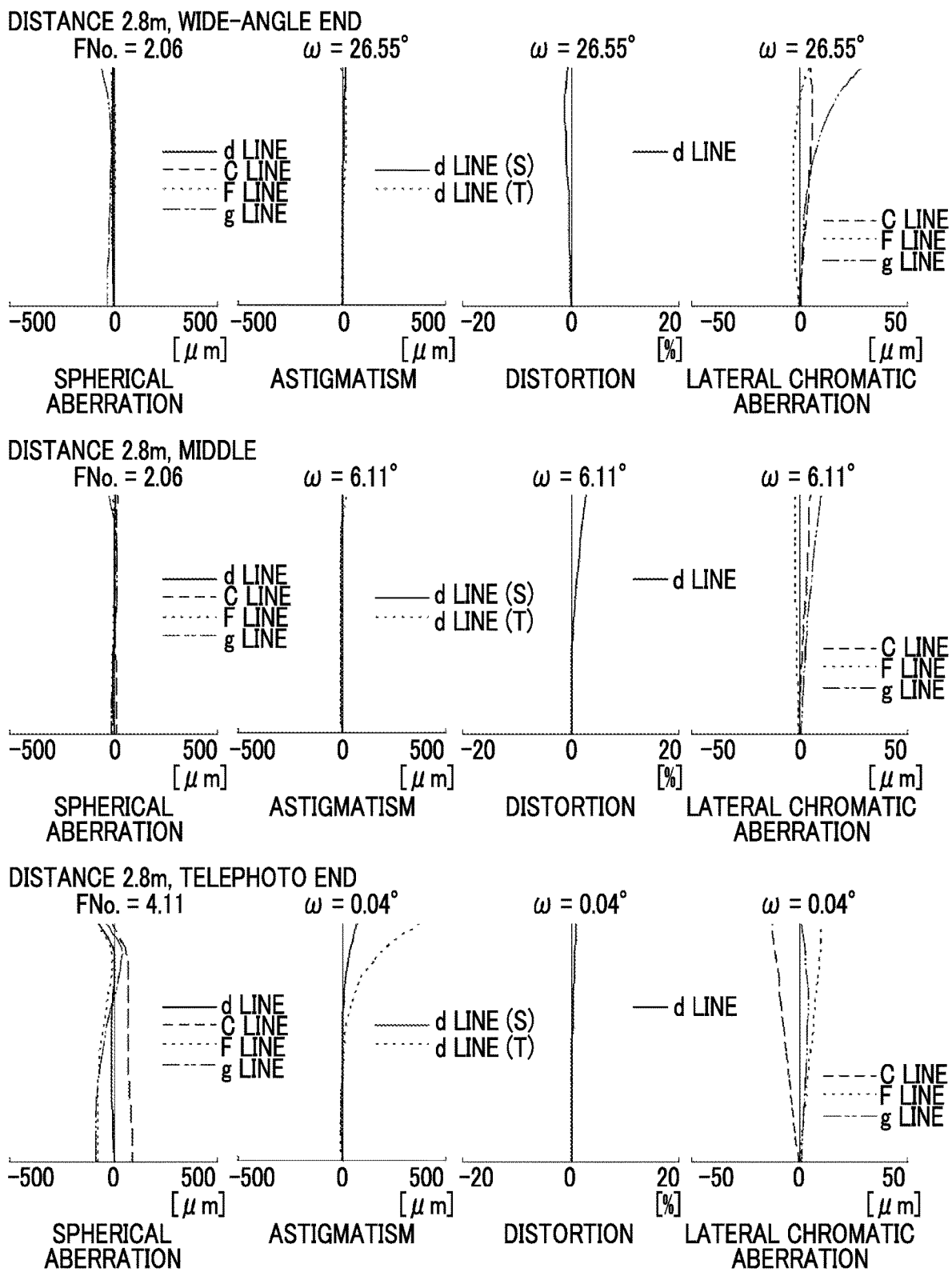
FIG. 14 is a diagram of aberrations of the zoom lens of Example 2 of the present invention in a state in which the closest object is in focus.

Regarding the zoom lens of Example 2, Table 5A and Table 5B show basic lens data, Table 6 shows a specification, Table 7 shows the distance between the groups, and Table 8 shows the amount of movement during focusing. In Table 8, the amount of movements of the middle focusing group GFm, the rear focusing group GFr, and the second subsequent group GR2 are shown in the columns denoted as "GFm", "GFr", and "GR2", respectively. Further, FIG. 13 shows aberration diagrams in a state where the object at infinity is in focus, and FIG. 14 shows aberration diagrams in a state where the closest object is in focus. These data in a case where the object distance of the closest object is set to 2.8 m (meters).

TABLE 5A

Example 2 Basic Lens Data

| Sn | R | D | Nd | νd | θgF | |
|---|---|---|---|---|---|---|
| 1 | 536.26299 | 3.000 | 1.83481 | 42.74 | 0.5649 | GFf |
| 2 | 145.10949 | 1.500 | | | | |
| 3 | 145.31454 | 13.778 | 1.43387 | 95.18 | 0.5373 | |
| 4 | −16443.96163 | DD[4] | | | | |
| 5 | 282.29583 | 6.699 | 1.43387 | 95.18 | 0.5373 | GFm |
| 6 | 4131608.75756 | 0.120 | | | | |
| 7 | 179.37816 | 9.688 | 1.43387 | 95.18 | 0.5373 | |
| 8 | −4906488.65949 | 0.120 | | | | |
| 9 | 134.16532 | 11.869 | 1.43387 | 95.18 | 0.5373 | |
| 10 | 2777777.77778 | DD[10] | | | | |
| 11 | ∞ | 2.550 | 1.43875 | 94.66 | 0.5340 | GFr |
| 12 | 1011.80105 | DD[12] | | | | |
| 13 | −1241.01658 | 1.100 | 1.88300 | 40.76 | 0.5668 | GV1 |
| 14 | 31.53861 | 5.723 | | | | |
| 15 | −74.91246 | 3.939 | 1.89286 | 20.36 | 0.6394 | |
| 16 | −26.95121 | 0.970 | 1.77891 | 50.11 | 0.5509 | |
| 17 | −692.82440 | DD[17] | | | | |
| 18 | −271.50303 | 1.200 | 1.89069 | 38.93 | 0.5732 | GV2 |
| 19 | 82.94205 | 6.618 | | | | |
| 20 | 65.79185 | 5.010 | 1.70593 | 29.70 | 0.6046 | |
| 21 | −202.05069 | 0.960 | 1.95169 | 32.56 | 0.5895 | |
| 22 | 375.91532 | DD[22] | | | | |
| 23 | −181.92824 | 2.931 | 1.86694 | 21.67 | 0.6331 | GV3 |
| 24 | −49.33093 | 0.960 | 1.90000 | 36.66 | 0.5792 | |
| 25 | −180.40603 | 2.007 | | | | |
| 26 | −65.96601 | 1.250 | 1.88300 | 40.76 | 0.5668 | |
| 27 | −253.84368 | DD[27] | | | | |

TABLE 5B

Example 2 Basic Lens Data

| Sn | R | D | Nd | νd | θgF | |
|---|---|---|---|---|---|---|
| 28 (St) | ∞ | 0.746 | | | | GR1 |
| 29 | 252.85135 | 4.139 | 1.74402 | 54.11 | 0.5559 | |
| 30 | −79.87511 | 0.621 | | | | |
| 31 | 325.79906 | 3.092 | 1.57789 | 71.15 | 0.5432 | |
| 32 | −110.18324 | 0.306 | | | | |
| 33 | 201.24582 | 3.199 | 1.72044 | 56.63 | 0.5466 | |
| 34 | −162.33564 | 0.348 | | | | |
| 35 | 96.03836 | 6.337 | 1.59005 | 69.09 | 0.5440 | |
| 36 | −59.05046 | 1.280 | 1.84861 | 23.30 | 0.6240 | |
| 37 | 600.83826 | 4.996 | | | | |
| 38 | −84.41332 | 1.000 | 1.81197 | 46.80 | 0.5570 | |
| 39 | 62.94370 | 3.644 | | | | |
| 40 | 43.62913 | 2.078 | 1.89999 | 20.00 | 0.6419 | |
| 41 | 66.82517 | DD[41] | | | | |
| 42 | 310.33041 | 1.960 | 1.84188 | 31.66 | 0.5955 | GR2 |
| 43 | −104.99365 | 3.356 | | | | |
| 44 | 87.34371 | 1.050 | 1.88310 | 38.85 | 0.5736 | |
| 45 | 25.96553 | 6.386 | 1.63246 | 63.77 | 0.5421 | |
| 46 | −159.67834 | 1.000 | | | | |
| 47 | −74.88038 | 3.683 | 1.48749 | 70.24 | 0.5301 | |
| 48 | −23.86444 | 1.692 | 1.78943 | 47.13 | 0.5571 | |
| 49 | −249.80868 | 2.063 | | | | |
| 50 | 187.61999 | 6.114 | 1.48749 | 70.24 | 0.5301 | |
| 51 | −34.58284 | DD[51] | | | | |
| 52 | ∞ | 33.000 | 1.60859 | 46.44 | 0.5666 | |
| 53 | ∞ | 13.200 | 1.51633 | 64.05 | 0.5346 | |
| 54 | ∞ | 13.591 | | | | |

TABLE 6

Example 2 Specification

| | Wide-Angle End | Middle | Telephoto End |
|---|---|---|---|
| Zr | 1.00 | 3.84 | 40.50 |
| f | 10.003 | 38.346 | 405.111 |

TABLE 6-continued

Example 2 Specification

| | Wide-Angle End | Middle | Telephoto End |
|---|---|---|---|
| FNo. | 2.06 | 2.06 | 3.85 |
| 2ω(°) | 60.36 | 15.92 | 1.54 |

TABLE 7

Example 2 Distance between Groups

| | Wide-Angle End | Middle | Telephoto End |
|---|---|---|---|
| *State of Focusing on Object at Infinity* | | | |
| DD[4] | 12.193 | 12.193 | 12.193 |
| DD[10] | 1.200 | 0.796 | 12.178 |
| DD[12] | 1.500 | 81.384 | 121.772 |
| DD[17] | 36.985 | 1.350 | 4.891 |
| DD[22] | 104.216 | 48.276 | 8.672 |
| DD[27] | 5.008 | 17.103 | 1.395 |
| DD[41] | 52.194 | 52.191 | 52.194 |
| DD[51] | 5.000 | 5.003 | 5.000 |
| *State of Focusing on Closest Object (at 2.8 m)* | | | |
| DD[4] | 1.651 | 1.651 | 1.651 |
| DD[10] | 12.048 | 27.243 | 22.720 |
| DD[12] | 1.194 | 65.480 | 121.772 |
| DD[17] | 36.985 | 1.350 | 4.891 |
| DD[22] | 104.216 | 48.276 | 8.672 |
| DD[27] | 5.008 | 17.103 | 1.395 |
| DD[41] | 52.194 | 52.304 | 52.155 |
| DD[51] | 5.000 | 4.890 | 5.039 |

TABLE 8

Example 2 Amount of Movement During Focusing

| | Wide-Angle End | Middle | Telephoto End |
|---|---|---|---|
| GFm | −10.542 | −10.542 | −10.542 |
| GFr | 0.306 | 15.905 | 0.000 |
| GR2 | 0.000 | 0.114 | −0.039 |

Example 3

Figure 6:
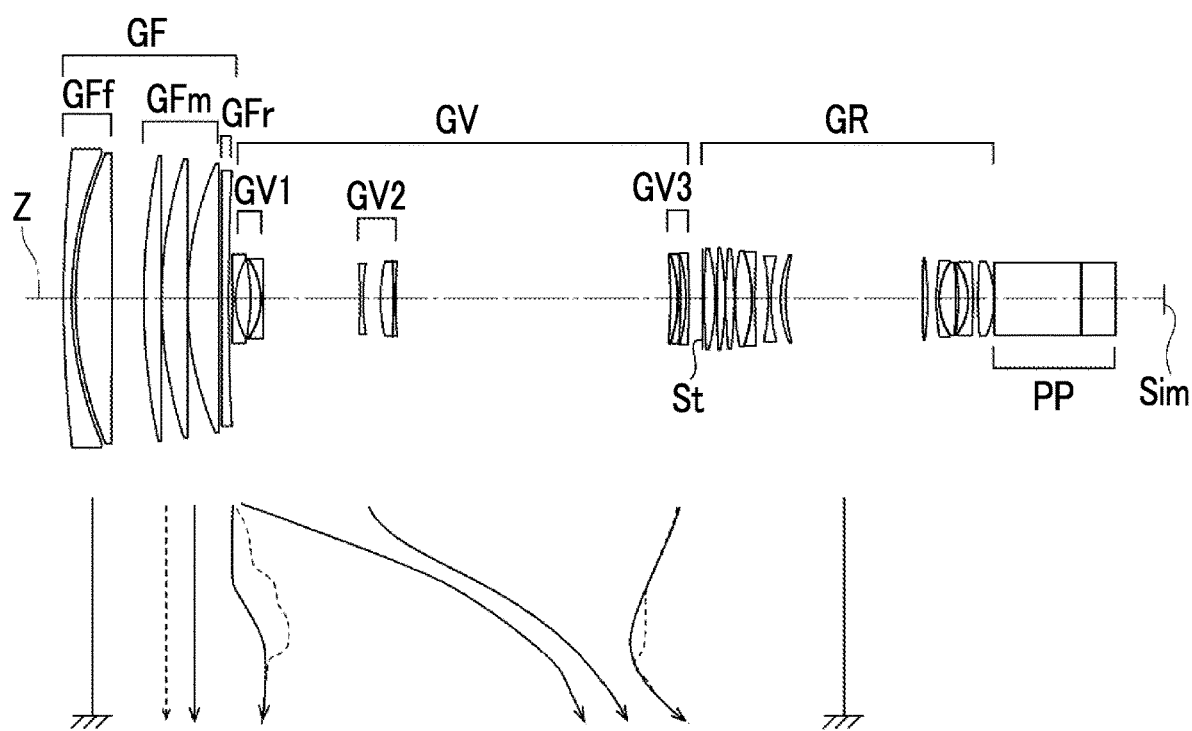
FIG. 6 is a diagram illustrating a cross-sectional view of a configuration of a zoom lens according to Example 3 of the present invention and a movement locus thereof.

FIG. 6 shows a cross-sectional view illustrating a configuration of the zoom lens of Example 3 and a movement locus. The zoom lens of Embodiment 3 consists of, in order from the object side to the image side, a focusing group GF, a zoom group GV, and a subsequent group GR. The focusing group GF consists of, in order from the object side to the image side, a front focusing group GFf, a middle focusing group GFm, and a rear focusing group GFr. The front focusing group GFf remains stationary with respect to the image plane Sim during zooming and focusing. The middle focusing group GFm remains stationary with respect to the image plane Sim during zooming, and moves along the optical axis Z during focusing. The rear focusing group GFr consists of one lens group, and moves along the optical axis Z during zooming and focusing. The zoom group GV consists of, in order from the object side to the image side, three lens groups of a first zoom group GV1, a second zoom group GV2, and a third zoom group GV3. The three groups move along the optical axis Z by changing the distances between the groups during zooming. The third zoom group GV3 moves along the optical axis Z also during focusing. The subsequent group GR remains stationary with respect to the image plane Sim during zooming and focusing.

Figure 16:
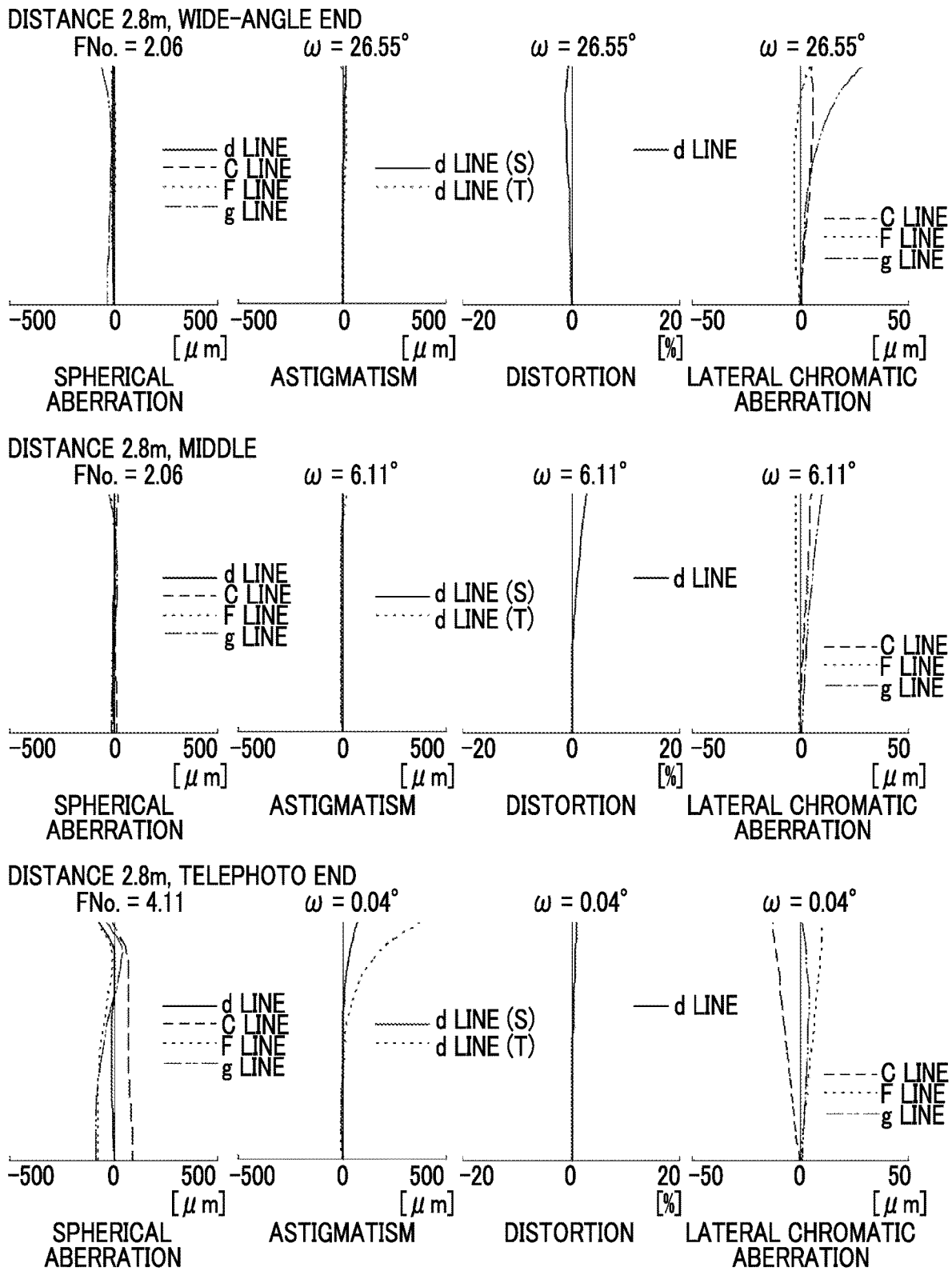
FIG. 16 is a diagram of aberrations of the zoom lens of Example 3 of the present invention in a state in which the closest object is in focus.

Regarding the zoom lens of Example 3, Table 9A and Table 9B show basic lens data, Table 10 shows a specification, Table 11 shows the distance between the groups, and Table 12 shows the amount of movement during focusing. In Table 12, the amount of movements of the middle focusing group GFm, the rear focusing group GFr, and the third zoom group GV3 are shown in the columns denoted as "GFm", "GFr", and "GV3", respectively. Further, FIG. 15 shows aberration diagrams in a state where the object at infinity is in focus, and FIG. 16 shows aberration diagrams in a state where the closest object is in focus. These are data in a case where the object distance of the closest object is set to 2.8 m (meters).

TABLE 9A

Example 3 Basic Lens Data

| Sn | R | D | Nd | vd | θgF | |
|---|---|---|---|---|---|---|
| 1 | 536.26299 | 3.000 | 1.83481 | 42.74 | 0.5649 | GFf |
| 2 | 145.10949 | 1.500 | | | | |
| 3 | 145.31454 | 13.778 | 1.43387 | 95.18 | 0.5373 | |
| 4 | −16443.96163 | DD[4] | | | | |
| 5 | 282.29583 | 6.699 | 1.43387 | 95.18 | 0.5373 | GFm |
| 6 | 4131608.75756 | 0.120 | | | | |
| 7 | 179.37816 | 9.688 | 1.43387 | 95.18 | 0.5373 | |
| 8 | −4906488.65949 | 0.120 | | | | |
| 9 | 134.16532 | 11.869 | 1.43387 | 95.18 | 0.5373 | |
| 10 | 2777777.77778 | DD[10] | | | | |
| 11 | ∞ | 2.550 | 1.43875 | 94.66 | 0.5340 | GFr |
| 12 | 1011.80105 | DD[12] | | | | |
| 13 | −1241.01658 | 1.100 | 1.88300 | 40.76 | 0.5668 | GV1 |
| 14 | 31.53861 | 5.723 | | | | |
| 15 | −74.91246 | 3.939 | 1.89286 | 20.36 | 0.6394 | |
| 16 | −26.95121 | 0.970 | 1.77891 | 50.11 | 0.5509 | |
| 17 | −692.82440 | DD[17] | | | | |
| 18 | −271.50303 | 1.200 | 1.89069 | 38.93 | 0.5732 | GV2 |
| 19 | 82.94205 | 6.618 | | | | |
| 20 | 65.79185 | 5.010 | 1.70593 | 29.70 | 0.6046 | |
| 21 | −202.05069 | 0.960 | 1.95169 | 32.56 | 0.5895 | |
| 22 | 375.91532 | DD[22] | | | | |
| 23 | −181.92824 | 2.931 | 1.86694 | 21.67 | 0.6331 | GV3 |
| 24 | −49.33093 | 0.960 | 1.90000 | 36.66 | 0.5792 | |
| 25 | −180.40603 | 2.007 | | | | |
| 26 | −65.96601 | 1.250 | 1.88300 | 40.76 | 0.5668 | |
| 27 | −253.84368 | DD[27] | | | | |

TABLE 9B

Example 3 Basic Lens Data

| Sn | R | D | Nd | vd | θgF | |
|---|---|---|---|---|---|---|
| 28 (St) | ∞ | 0.746 | | | | GR |
| 29 | 252.85135 | 4.139 | 1.74402 | 54.11 | 0.5559 | |
| 30 | −79.87511 | 0.621 | | | | |
| 31 | 325.79906 | 3.092 | 1.57789 | 71.15 | 0.5432 | |
| 32 | −110.18324 | 0.306 | | | | |
| 33 | 201.24582 | 3.199 | 1.72044 | 56.63 | 0.5466 | |
| 34 | −162.33564 | 0.348 | | | | |
| 35 | 96.03836 | 6.337 | 1.59005 | 69.09 | 0.5440 | |
| 36 | −59.05046 | 1.280 | 1.84861 | 23.30 | 0.6240 | |
| 37 | 600.83826 | 4.996 | | | | |
| 38 | −84.41332 | 1.000 | 1.81197 | 46.80 | 0.5570 | |
| 39 | 62.94370 | 3.644 | | | | |
| 40 | 43.62913 | 2.078 | 1.89999 | 20.00 | 0.6419 | |
| 41 | 66.82517 | 52.194 | | | | |
| 42 | 310.33041 | 1.960 | 1.84188 | 31.66 | 0.5955 | |
| 43 | −104.99365 | 3.356 | | | | |
| 44 | 87.34371 | 1.050 | 1.88310 | 38.85 | 0.5736 | |
| 45 | 25.96553 | 6.386 | 1.63246 | 63.77 | 0.5421 | |
| 46 | −159.67834 | 1.000 | | | | |
| 47 | −74.88038 | 3.683 | 1.48749 | 70.24 | 0.5301 | |
| 48 | −23.86444 | 1.692 | 1.78943 | 47.13 | 0.5571 | |
| 49 | −249.80868 | 2.063 | | | | |

TABLE 9B-continued

Example 3 Basic Lens Data

| Sn | R | D | Nd | vd | θgF |
|---|---|---|---|---|---|
| 50 | 187.61999 | 6.114 | 1.48749 | 70.24 | 0.5301 |
| 51 | −34.58284 | 0.000 | | | |
| 52 | ∞ | 33.000 | 1.60859 | 46.44 | 0.5666 |
| 53 | ∞ | 13.200 | 1.51633 | 64.05 | 0.5346 |
| 54 | ∞ | 18.591 | | | |

TABLE 10

Example 3 Specification

| | Wide-Angle End | Middle | Telephoto End |
|---|---|---|---|
| Zr | 1.00 | 3.84 | 40.50 |
| f | 10.003 | 38.346 | 405.111 |
| FNo. | 2.06 | 2.06 | 3.85 |
| 2ω(°) | 60.36 | 15.92 | 1.54 |

TABLE 11

Example 3 Distance between Groups

| | Wide-Angle End | Middle | Telephoto End |
|---|---|---|---|
| State of Focusing on Object at Infinity | | | |
| DD[4] | 12.193 | 12.193 | 12.193 |
| DD[10] | 1.200 | 0.796 | 12.178 |
| DD[12] | 1.500 | 81.384 | 121.772 |
| DD[17] | 36.985 | 1.350 | 4.891 |
| DD[22] | 104.216 | 48.273 | 8.672 |
| DD[27] | 5.008 | 17.106 | 1.395 |
| State of Focusing on Closest Object (at 2.8 m) | | | |
| DD[4] | 1.651 | 1.651 | 1.651 |
| DD[10] | 12.048 | 27.243 | 22.720 |
| DD[12] | 1.194 | 65.480 | 121.772 |
| DD[17] | 36.985 | 1.350 | 4.891 |
| DD[22] | 104.216 | 48.387 | 8.639 |
| DD[27] | 5.008 | 16.991 | 1.428 |

TABLE 12

Example 3 Amount of Movement During Focusing

| | Wide-Angle End | Middle | Telephoto End |
|---|---|---|---|
| GFm | −10.542 | −10.542 | −10.542 |
| GFr | 0.306 | 15.905 | 0.000 |
| GV3 | 0.000 | 0.115 | −0.033 |

Example 4

Figure 7:
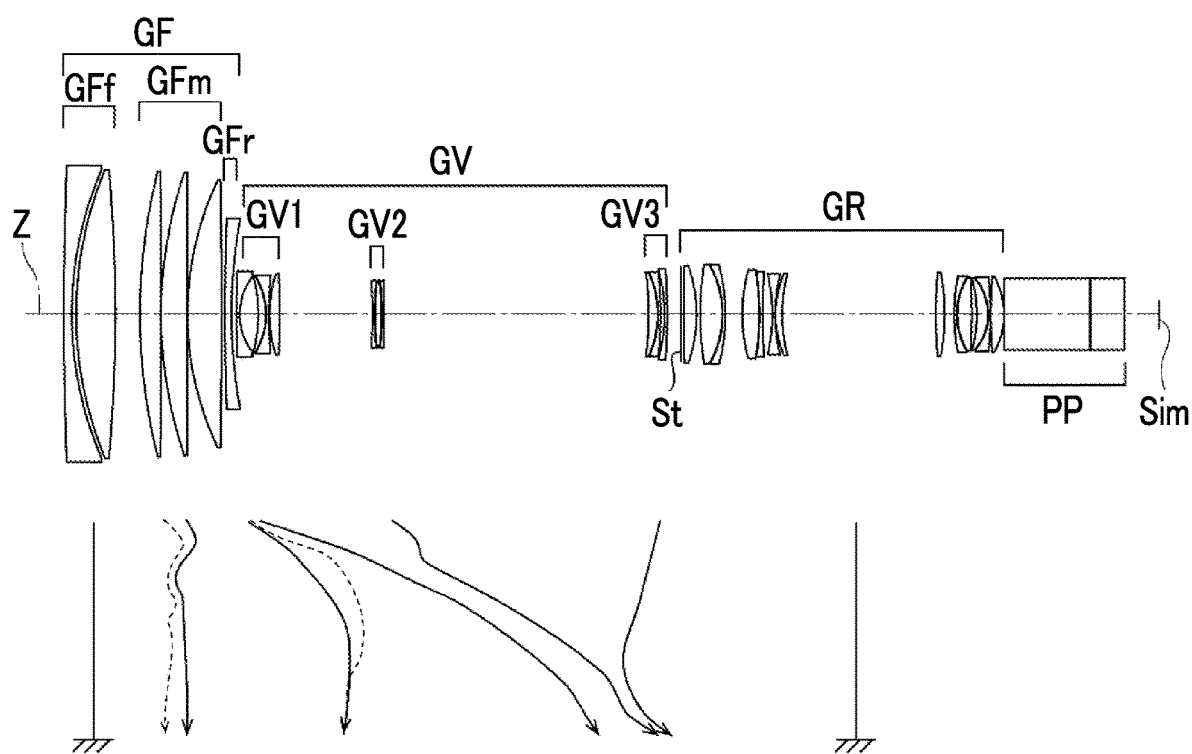
FIG. 7 is a diagram illustrating a cross-sectional view of a configuration of a zoom lens according to Example 4 of the present invention and a movement locus thereof.

FIG. 7 shows a cross-sectional view illustrating a configuration of the zoom lens of Example 4 and a movement locus. The zoom lens of Embodiment 4 consists of, in order from the object side to the image side, a focusing group GF, a zoom group GV, and a subsequent group GR. The focusing group GF consists of, in order from the object side to the image side, a front focusing group GFf, a middle focusing group GFm, and a rear focusing group GFr. The front focusing group GFf remains stationary with respect to the image plane Sim during zooming and focusing. The middle focusing group GFm consists of one lens group, and moves along the optical axis Z during zooming and focusing. The rear focusing group GFr moves along the optical axis Z during zooming and focusing. The zoom group GV consists of, in order from the object side to the image side, three lens groups of a first zoom group GV1, a second zoom group GV2, and a third zoom group GV3. The three groups move along the optical axis Z by changing the distances between the groups during zooming. The subsequent group GR remains stationary with respect to the image plane Sim during zooming and focusing.

Regarding the zoom lens of Example 4, Table 13A and Table 13B show basic lens data, Table 14 shows a specification, Table 15 shows the distance between the groups, and Table 16 shows the amount of movement during focusing. In Table 16, the amount of movements of the middle focusing group GFm and the rear focusing group GFr are shown in the columns denoted as "GFm" and "GFr", respectively. Further, FIG. 17 shows aberration diagrams in a state where the object at infinity is in focus, and FIG. 18 shows aberration diagrams in a state where the closest object is in focus. These are data in a case where the object distance of the closest object is set to 2.8 m (meters).

TABLE 13A

Example 4 Basic Lens Data

| Sn | R | D | Nd | vd | θgF | |
|---|---|---|---|---|---|---|
| 1 | 1555.23671 | 3.000 | 1.80400 | 46.53 | 0.5578 | GFf |
| 2 | 146.65470 | 1.681 | | | | |
| 3 | 150.64334 | 15.000 | 1.43387 | 95.18 | 0.5373 | |
| 4 | −653.82981 | DD[4] | | | | |
| 5 | 233.11537 | 7.979 | 1.43387 | 95.18 | 0.5373 | GFm |
| 6 | −14982.54054 | 0.120 | | | | |
| 7 | 177.80212 | 10.006 | 1.43387 | 95.18 | 0.5373 | |
| 8 | −37666.92429 | 0.120 | | | | |
| 9 | 124.79361 | 13.158 | 1.43387 | 95.18 | 0.5373 | |
| 10 | −2943.36943 | DD[10] | | | | |
| 11 | 1164.37477 | 2.550 | 1.53775 | 74.70 | 0.5394 | GFr |
| 12 | 209.48974 | DD[12] | | | | |
| 13 | 2447.66252 | 1.100 | 1.86599 | 40.63 | 0.5702 | GV1 |
| 14 | 24.03970 | 7.083 | | | | |
| 15 | −57.97789 | 3.008 | 1.89999 | 20.00 | 0.6313 | |
| 16 | −28.64720 | 1.210 | 1.88203 | 39.72 | 0.5691 | |
| 17 | 265.29611 | 0.120 | | | | |
| 18 | 52.16908 | 3.858 | 1.89814 | 24.52 | 0.6167 | |
| 19 | −526.46999 | DD[19] | | | | |
| 20 | −198.09876 | 0.960 | 1.84548 | 43.45 | 0.5632 | GV2 |
| 21 | 115.80831 | 2.594 | 1.64375 | 40.56 | 0.5768 | |
| 22 | −102.13011 | 0.960 | 1.86560 | 41.44 | 0.5650 | |
| 23 | −562.30261 | DD[23] | | | | |
| 24 | −132.00616 | 3.622 | 1.89833 | 20.83 | 0.6286 | GV3 |
| 25 | −39.18174 | 0.970 | 1.89654 | 36.84 | 0.5773 | |
| 26 | −184.80712 | 1.622 | | | | |
| 27 | −60.42866 | 0.960 | 1.87204 | 40.26 | 0.5741 | |
| 28 | −258.18342 | DD[28] | | | | |

TABLE 13B

Example 4 Basic Lens Data

| Sn | R | D | Nd | vd | θgF | |
|---|---|---|---|---|---|---|
| 29 (St) | ∞ | 1.063 | | | | GR |
| 30 | 833.49031 | 4.959 | 1.74188 | 54.31 | 0.5558 | |
| 31 | −56.61697 | 1.340 | | | | |
| 32 | 118.48209 | 8.544 | 1.67013 | 61.58 | 0.5428 | |
| 33 | −40.28605 | 1.200 | 1.90687 | 32.92 | 0.5895 | |
| 34 | −72.43680 | 6.422 | | | | |
| 35 | 65.54471 | 6.566 | 1.59692 | 68.84 | 0.5409 | |
| 36 | −105.26376 | 1.280 | 1.89796 | 20.11 | 0.6309 | |
| 37 | 283.75121 | 3.740 | | | | |
| 38 | −65.11129 | 1.000 | 1.79550 | 48.45 | 0.5516 | |
| 39 | 64.48379 | 0.120 | | | | |
| 40 | 39.60836 | 2.628 | 1.84243 | 24.46 | 0.6155 | |

TABLE 13B-continued

Example 4 Basic Lens Data

| Sn | R | D | Nd | vd | θgF |
|---|---|---|---|---|---|
| 41 | 64.92014 | 59.123 | | | |
| 42 | 189.16806 | 3.399 | 1.77093 | 26.92 | 0.6070 |
| 43 | −89.69776 | 3.699 | | | |
| 44 | 78.48015 | 1.050 | 1.89056 | 37.73 | 0.5765 |
| 45 | 28.43213 | 5.668 | 1.64102 | 62.98 | 0.5430 |
| 46 | −278.24025 | 1.957 | | | |
| 47 | −52.11121 | 4.332 | 1.48749 | 70.24 | 0.5301 |
| 48 | −21.45472 | 0.900 | 1.83344 | 42.55 | 0.5656 |
| 49 | −119.79901 | 0.120 | | | |
| 50 | 184.42588 | 5.086 | 1.48749 | 70.24 | 0.5301 |
| 51 | −30.42049 | 0.000 | | | |
| 52 | ∞ | 33.000 | 1.60859 | 46.44 | 0.5666 |
| 53 | ∞ | 13.200 | 1.51633 | 64.05 | 0.5346 |
| 54 | ∞ | 13.143 | | | |

TABLE 14

Example 4 Specification

| | Wide-Angle End | Middle | Telephoto End |
|---|---|---|---|
| Zr | 1.00 | 1.96 | 45.30 |
| f | 10.063 | 19.931 | 455.703 |
| FNo. | 2.06 | 2.06 | 4.35 |
| 2ω(°) | 60.06 | 29.66 | 1.36 |

TABLE 15

Example 4 Distance between Groups

| | Wide-Angle End | Middle | Telephoto End |
|---|---|---|---|
| State of Focusing on Object at Infinity | | | |
| DD[4] | 9.473 | 7.473 | 9.523 |
| DD[10] | 1.200 | 23.966 | 38.482 |
| DD[12] | 2.000 | 23.722 | 98.323 |
| DD[19] | 35.878 | 5.194 | 7.022 |
| DD[23] | 101.273 | 86.281 | 1.039 |
| DD[28] | 5.279 | 8.467 | 0.714 |
| State of Focusing on Closest Object (at 2.8 m) | | | |
| DD[4] | 0.868 | 4.473 | 0.868 |
| DD[10] | 9.823 | 39.802 | 47.033 |
| DD[12] | 1.982 | 10.885 | 98.427 |
| DD[19] | 35.878 | 5.194 | 7.022 |
| DD[23] | 101.273 | 86.281 | 1.039 |
| DD[28] | 5.279 | 8.467 | 0.714 |

TABLE 16

Example 4 Amount of Movement During Focusing

| | Wide-Angle End | Middle | Telephoto End |
|---|---|---|---|
| GFm | −8.605 | −3.000 | −8.655 |
| GFr | 0.018 | 12.836 | −0.104 |

Example 5

Figure 8:
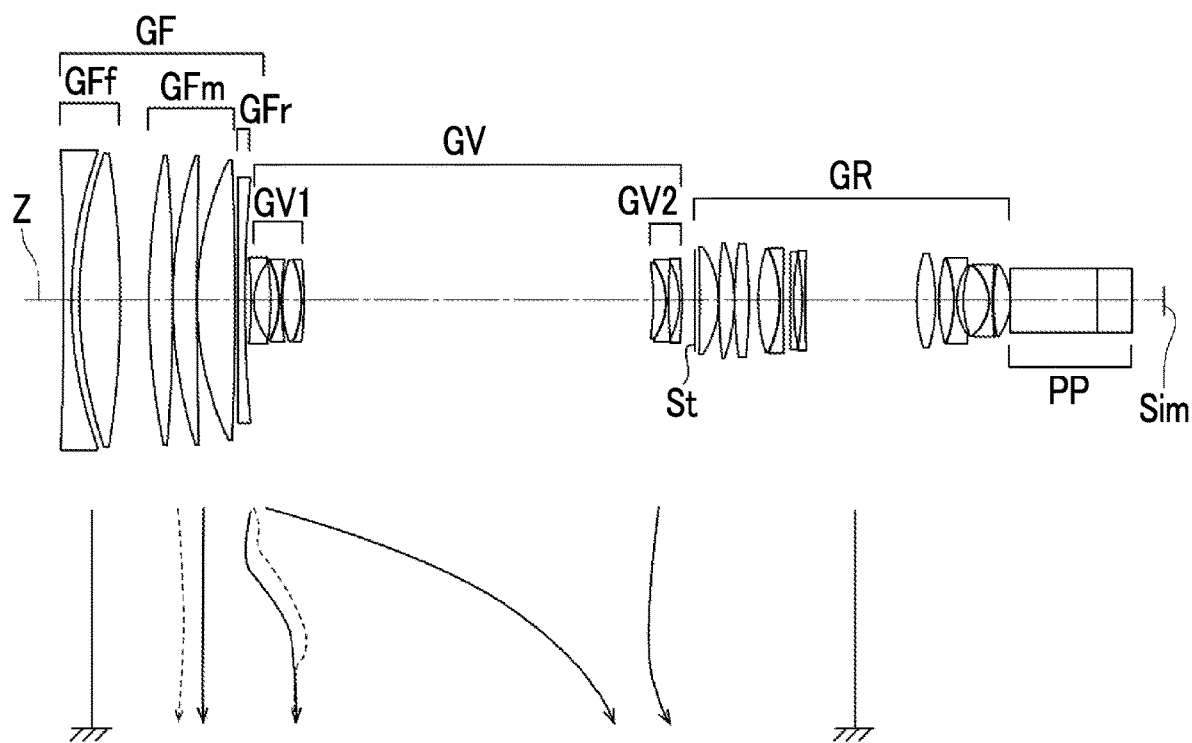
FIG. 8 is a diagram illustrating a cross-sectional view of a configuration of a zoom lens according to Example 5 of the present invention and a movement locus thereof.

FIG. 8 shows a cross-sectional view illustrating a configuration of the zoom lens of Example 5 and a movement locus. The zoom lens of Embodiment 5 consists of, in order from the object side to the image side, a focusing group GF, a zoom group GV, and a subsequent group GR. The focusing group GF consists of, in order from the object side to the image side, a front focusing group GFf, a middle focusing group GFm, and a rear focusing group GFr. The front focusing group GFf remains stationary with respect to the image plane Sim during zooming and focusing. The middle focusing group GFm consists of one lens group, and moves along the optical axis Z during zooming and focusing. The rear focusing group GFr moves along the optical axis Z during zooming and focusing. The zoom group GV consists of, in order from the object side to the image side, two lens groups of a first zoom group GV1 and a second zoom group GV2. The two groups move along the optical axis Z by changing the distance between the groups during zooming. The subsequent group GR remains stationary with respect to the image plane Sim during zooming and focusing.

Figure 20:
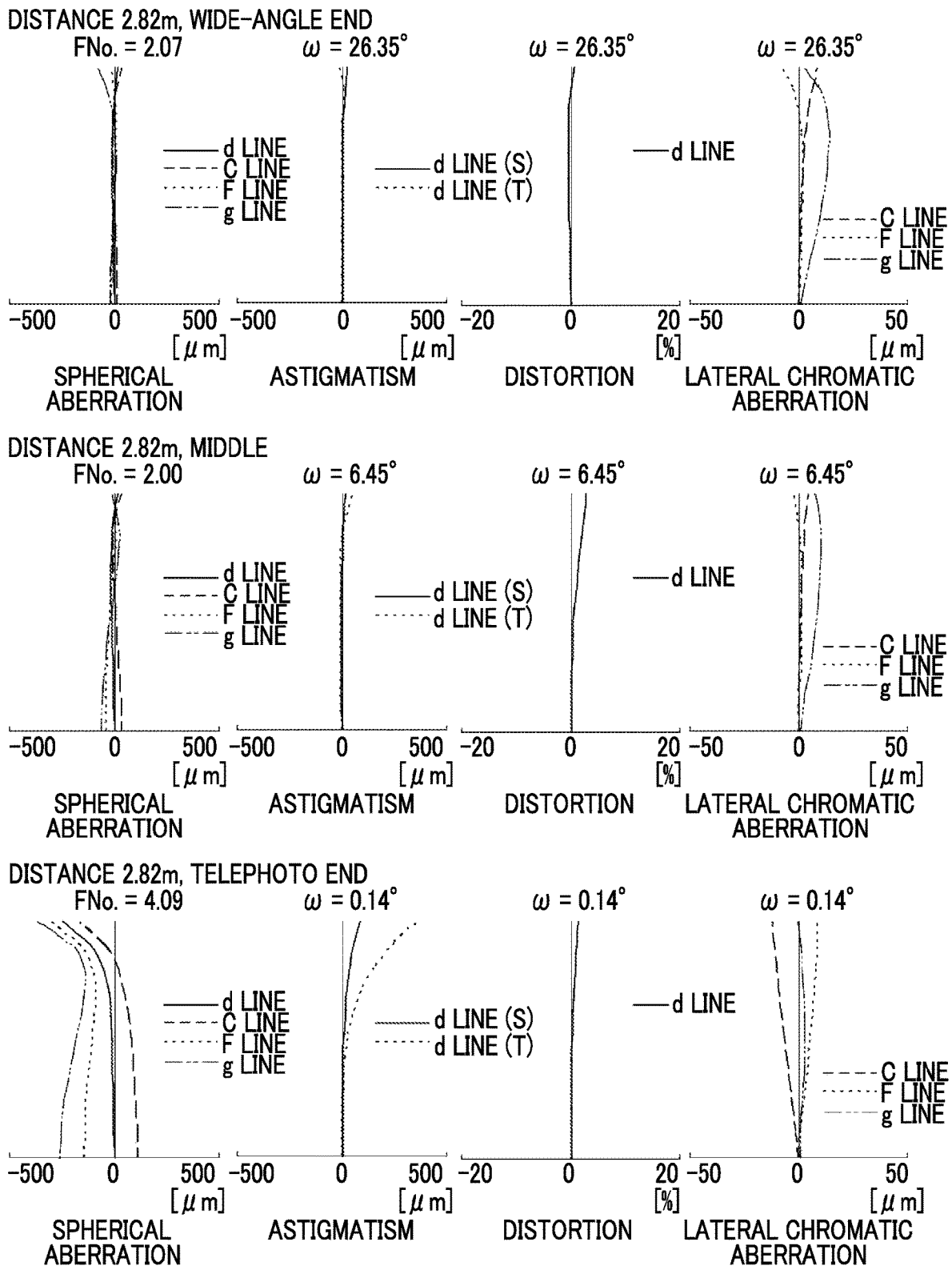
FIG. 20 is a diagram of aberrations of the zoom lens of Example 5 of the present invention in a state in which the closest object is in focus.

Regarding the zoom lens of Example 5, Table 17A and Table 17B show basic lens data, Table 18 shows a specification, Table 19 shows the distance between the groups, and Table 20 shows the amount of movement during focusing. In Table 20, the amount of movements of the middle focusing group GFm and the rear focusing group GFr are shown in the columns denoted as "GFm" and "GFr", respectively. Further, FIG. 19 shows aberration diagrams in a state where the object at infinity is in focus, and FIG. 20 shows aberration diagrams in a state where the closest object is in focus. These are data in a case where the object distance of the closest object is set to 2.82 m (meters).

The zoom lens of Example 5 has an aspheric surface, and the aspheric surface coefficients thereof are shown in Table 21. In the table of the basic lens data, the reference sign * is attached to surface numbers of aspheric surfaces, and numerical values of the paraxial radius of curvature are written into the column of the radius of curvature of the aspheric surface. In Table 21, the row of Sn shows surface numbers of the aspheric surfaces, and the rows of KA and Am (m is an integer of 3 or more) shows numerical values of the aspheric surface coefficients for each aspheric surface. The "E±n" (n: an integer) in numerical values of the aspheric surface coefficients of Table 21 indicates "×10$^{±n}$". KA and Am are the aspheric surface coefficients in the aspheric surface expression represented by the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of a paraxial radius of curvature, and KA and Am are aspheric surface coefficients, and Σ in the aspheric surface expression means the sum with respect to m. The symbols, meanings, and description methods of each data relating to the aspheric surface coefficients described above are the same as those in the following embodiments. Therefore, the description will not be repeated below.

TABLE 17A

Example 5 Basic Lens Data

| Sn | R | D | Nd | vd | θgF | |
|---|---|---|---|---|---|---|
| 1 | −1464.27783 | 3.000 | 1.80400 | 46.53 | 0.5578 | GFf |
| 2 | 170.74464 | 3.000 | | | | |
| 3 | 180.02526 | 15.500 | 1.43387 | 95.18 | 0.5373 | |
| 4 | −379.24425 | DD[4] | | | | |
| 5 | 285.80465 | 9.026 | 1.43387 | 95.18 | 0.5373 | GFm |
| 6 | −755.32654 | 0.120 | | | | |

TABLE 17A-continued

Example 5 Basic Lens Data

| Sn | R | D | Nd | vd | θgF | |
|---|---|---|---|---|---|---|
| 7 | 190.10668 | 9.064 | 1.43875 | 94.66 | 0.5340 | |
| 8 | 2238.89234 | 0.120 | | | | |
| 9 | 131.02269 | 14.314 | 1.43387 | 95.18 | 0.5373 | |
| 10 | −1473.16409 | DD[10] | | | | |
| 11 | 26644848.20491 | 2.617 | 1.49700 | 81.54 | 0.5375 | GFr |
| 12 | 548.84551 | DD[12] | | | | |
| *13 | −113.85913 | 1.100 | 1.90043 | 37.37 | 0.5772 | GV1 |
| 14 | 23.40384 | 6.314 | | | | |
| 15 | −111.67953 | 3.238 | 1.89286 | 20.36 | 0.6394 | |
| 16 | −34.62703 | 0.970 | 1.89190 | 37.13 | 0.5781 | |
| 17 | 117.92433 | 0.120 | | | | |
| 18 | 46.95440 | 7.642 | 1.75520 | 27.51 | 0.6103 | |
| 19 | −40.46124 | 0.960 | 1.90525 | 35.04 | 0.5849 | |
| 20 | −140.39627 | DD[20] | | | | |
| 21 | −107.38114 | 4.883 | 1.80518 | 25.42 | 0.6162 | GV2 |
| 22 | −25.58140 | 0.970 | 1.80400 | 46.53 | 0.5578 | |
| 23 | 320.50319 | 4.068 | | | | |
| 24 | −32.72276 | 0.960 | 1.60311 | 60.64 | 0.5415 | |
| 25 | −179.89525 | DD[25] | | | | |

TABLE 17B

Example 5 Basic Lens Data

| Sn | R | D | Nd | vd | θgF | |
|---|---|---|---|---|---|---|
| 26 (St) | ∞ | 1.893 | | | | GR |
| 27 | −700.96934 | 7.092 | 1.53775 | 74.70 | 0.5394 | |
| 28 | −39.02435 | 0.120 | | | | |
| 29 | 198.73606 | 5.846 | 1.49700 | 81.54 | 0.5375 | |
| 30 | −68.50423 | 0.120 | | | | |
| 31 | 155.06547 | 5.442 | 1.80400 | 46.53 | 0.5578 | |
| 32 | −208.37294 | 3.511 | | | | |
| 33 | 72.22308 | 8.279 | 1.49700 | 81.54 | 0.5375 | |
| 34 | −47.53229 | 1.280 | 1.84666 | 23.78 | 0.6205 | |
| 35 | 7586.66386 | 2.686 | | | | |
| 36 | −5737.35327 | 1.190 | 1.49700 | 81.54 | 0.5375 | |
| 37 | 98.05128 | 3.262 | | | | |
| 38 | −108.29865 | 1.200 | 1.49700 | 81.54 | 0.5375 | |
| 39 | 593.39126 | 42.518 | | | | |
| 40 | 64.31883 | 7.315 | 1.60311 | 60.64 | 0.5415 | |
| 41 | −64.32259 | 1.194 | | | | |
| 42 | 61.04869 | 5.738 | 1.80518 | 25.42 | 0.6162 | |
| 43 | −46.56336 | 1.111 | 1.85150 | 40.78 | 0.5696 | |
| 44 | 23.78843 | 2.487 | | | | |
| 45 | 40.18202 | 9.710 | 1.51633 | 64.14 | 0.5353 | |
| 46 | −17.67729 | 1.390 | 1.85150 | 40.78 | 0.5696 | |
| 47 | 137.22042 | 0.260 | | | | |
| 48 | 67.49132 | 6.436 | 1.49700 | 81.54 | 0.5375 | |
| 49 | −23.95696 | 0.000 | | | | |
| 50 | ∞ | 33.000 | 1.60859 | 46.44 | 0.5666 | |
| 51 | ∞ | 13.200 | 1.51633 | 64.05 | 0.5346 | |
| 52 | ∞ | 12.483 | | | | |

TABLE 18

Example 5 Specification

| | Wide-Angle End | Middle | Telephoto End |
|---|---|---|---|
| Zr | 1.00 | 3.84 | 40.50 |
| f | 10.043 | 38.645 | 406.757 |
| FNo. | 2.07 | 2.00 | 3.85 |
| 2ω(°) | 59.44 | 15.80 | 1.52 |

TABLE 19

Example 5 Distance between Groups

| | Wide-Angle End | Middle | Telephoto End |
|---|---|---|---|
| State of Focusing on Object at Infinity | | | |
| DD[4] | 10.895 | 10.295 | 10.895 |
| DD[10] | 1.230 | 4.528 | 17.824 |
| DD[12] | 2.343 | 82.069 | 120.436 |
| DD[20] | 132.650 | 46.471 | 1.598 |
| DD[25] | 4.939 | 8.695 | 1.305 |
| State of Focusing on Closest Object (at 2.8 m) | | | |
| DD[4] | 1.586 | 3.395 | 1.586 |
| DD[10] | 10.628 | 20.852 | 27.232 |
| DD[12] | 2.254 | 72.645 | 120.337 |
| DD[20] | 132.650 | 46.471 | 1.598 |
| DD[25] | 4.939 | 8.695 | 1.305 |

TABLE 20

Example 5 Amount of Movement During Focusing

| | Wide-Angle End | Middle | Telephoto End |
|---|---|---|---|
| GFm | −9.309 | −6.900 | −9.309 |
| GFr | 0.089 | 9.424 | 0.099 |

TABLE 21

Example 5 Aspheric Surface Coefficient

| Sn | 13 |
|---|---|
| KA | 1.0000000E+00 |
| A4 | 5.9614168E−06 |
| A6 | −3.0877714E−09 |
| A8 | −5.4860380E−12 |
| A10 | 2.1201453E−14 |
| A12 | −1.8736830E−17 |
| A14 | 5.7528952E−21 |
| A16 | −1.1083101E−22 |
| A18 | 7.3344116E−25 |
| A20 | −7.2129359E−28 |
| A22 | −2.6963198E−30 |
| A24 | 1.7933407E−32 |
| A26 | 9.8231368E−35 |
| A28 | −1.1671524E−36 |
| A30 | 2.3589541E−39 |

Example 6

Figure 9:
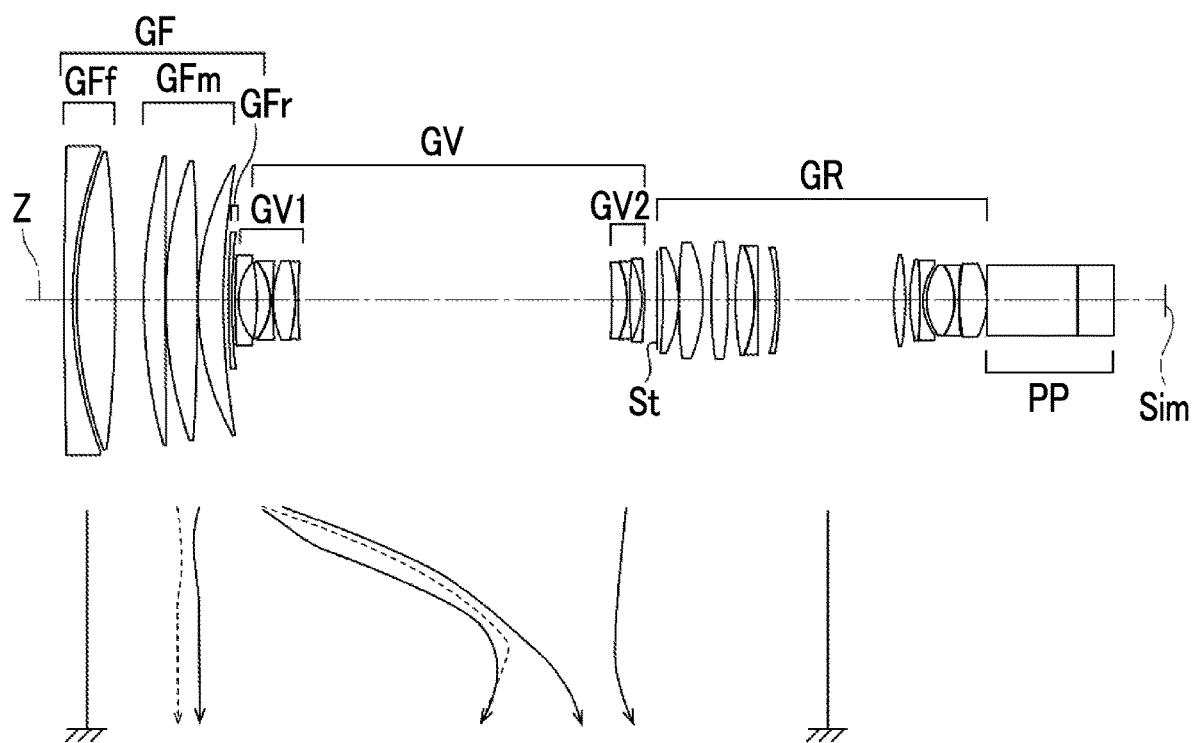
FIG. 9 is a diagram illustrating a cross-sectional view of a configuration of a zoom lens according to Example 6 of the present invention and a movement locus thereof.

FIG. 9 shows a cross-sectional view illustrating a configuration of the zoom lens of Example 6 and a movement locus. The zoom lens of Embodiment 6 consists of, in order from the object side to the image side, a focusing group GF, a zoom group GV, and a subsequent group GR. The focusing group GF consists of, in order from the object side to the image side, a front focusing group GFf, a middle focusing group GFm, and a rear focusing group GFr. The front focusing group GFf remains stationary with respect to the image plane Sim during zooming and focusing. The middle focusing group GFm consists of one lens group, and moves along the optical axis Z during zooming and focusing. The rear focusing group GFr moves along the optical axis Z during zooming and focusing. The zoom group GV consists of, in order from the object side to the image side, two lens groups of a first zoom group GV1 and a second zoom group GV2. The two groups move along the optical axis Z by changing the distance between the groups during zooming.

The subsequent group GR remains stationary with respect to the image plane Sim during zooming and focusing.

Figure 22:
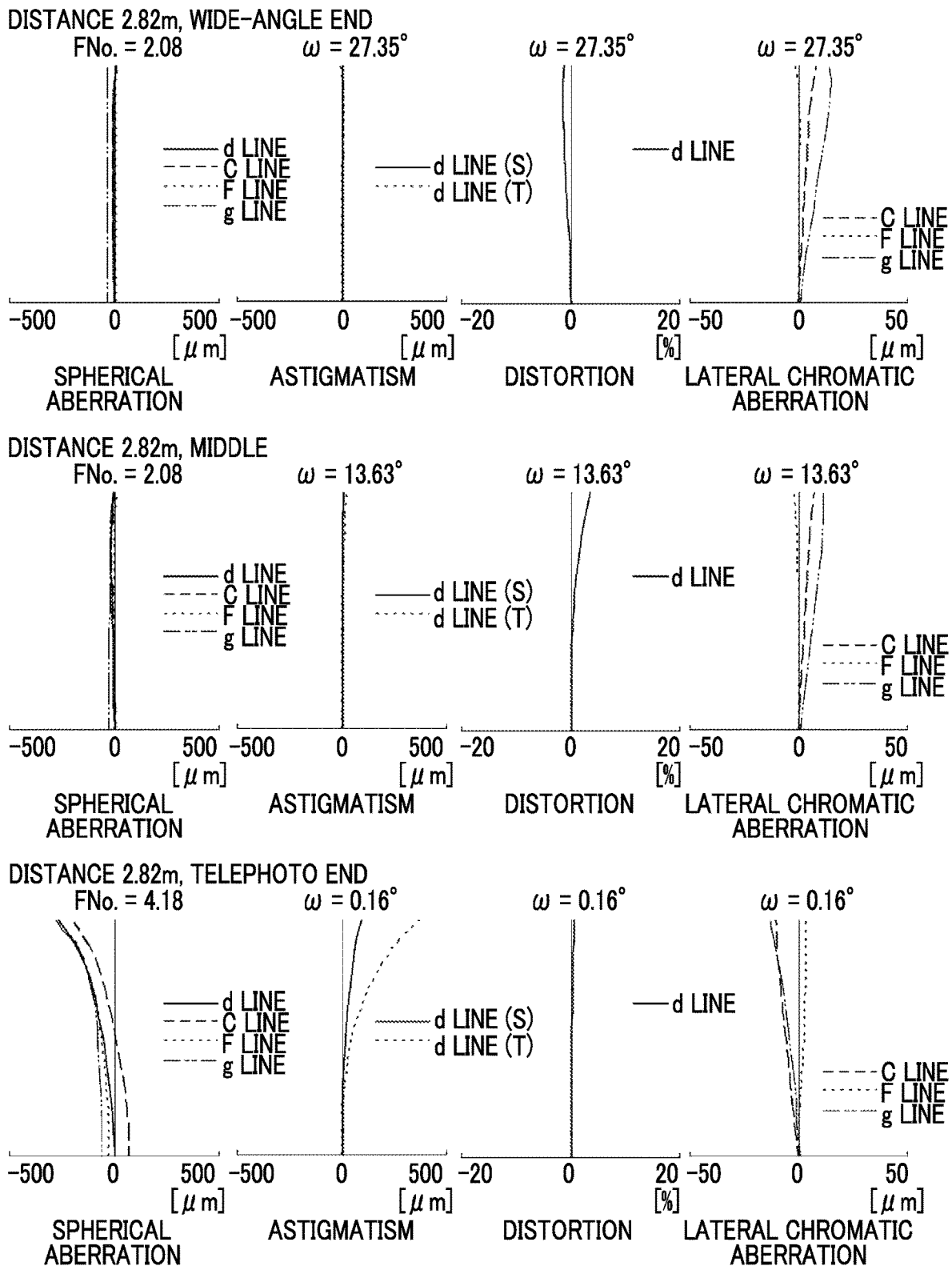
FIG. 22 is a diagram of aberrations of the zoom lens of Example 6 of the present invention in a state in which the closest object is in focus.

Table 22A and Table 22B show basic lens data, Table 23 shows a specification of the zoom lens of Example 6, Table 24 shows the distance between the groups, and Table 25 shows the amount of movement during focusing. In Table 25, the amount of movements of the middle focusing group GFm and the rear focusing group GFr are shown in the columns denoted as "GFm" and "GFr", respectively. Further, FIG. 21 shows aberration diagrams in a state where the object at infinity is in focus, and FIG. 22 shows aberration diagrams in a state where the closest object is in focus. These are data in a case where the object distance of the closest object is set to 2.82 m (meters).

TABLE 22A

Example 6 Basic Lens Data

| Sn | R | D | Nd | vd | θgF | |
|---|---|---|---|---|---|---|
| 1 | 2135.84708 | 3.000 | 1.85585 | 42.42 | 0.5629 | GFf |
| 2 | 161.76613 | 1.500 | | | | |
| 3 | 165.15649 | 14.040 | 1.43387 | 95.18 | 0.5373 | |
| 4 | −491.59362 | DD[4] | | | | |
| 5 | 209.94752 | 7.819 | 1.43875 | 94.66 | 0.5340 | GFm |
| 6 | 4817.06994 | 0.120 | | | | |
| 7 | 163.01598 | 11.585 | 1.43875 | 94.66 | 0.5340 | |
| 8 | −908.43097 | 0.131 | | | | |
| 9 | 106.26940 | 9.291 | 1.43875 | 94.66 | 0.5340 | |
| 10 | 297.48273 | DD[10] | | | | |
| 11 | 444.13837 | 1.200 | 1.49700 | 81.54 | 0.5375 | GFr |
| 12 | 236.80321 | DD[12] | | | | |
| 13 | 293.11041 | 1.200 | 1.88300 | 40.76 | 0.5668 | GV1 |
| 14 | 22.09362 | 6.722 | | | | |
| 15 | −83.78899 | 4.857 | 1.87856 | 20.77 | 0.6380 | |
| 16 | −23.59636 | 0.960 | 1.87894 | 40.11 | 0.5681 | |
| 17 | 208.30595 | 0.120 | | | | |
| 18 | 37.63915 | 8.264 | 1.69514 | 31.94 | 0.5940 | |
| 19 | −48.71217 | 0.960 | 1.91079 | 35.26 | 0.5822 | |
| 20 | 154.94337 | DD[20] | | | | |
| 21 | −283.84757 | 5.582 | 1.89999 | 20.00 | 0.6313 | GV2 |
| 22 | −35.75726 | 0.970 | 1.83265 | 43.91 | 0.5605 | |
| 23 | 152.10260 | 4.288 | | | | |
| 24 | −31.71220 | 0.960 | 1.85744 | 42.26 | 0.5632 | |
| 25 | −150.50637 | DD[25] | | | | |

TABLE 22B

Example 6 Basic Lens Data

| Sn | R | D | Nd | vd | θgF | |
|---|---|---|---|---|---|---|
| 26 (St) | ∞ | 2.243 | | | | GR |
| 27 | −192.64537 | 5.665 | 1.60937 | 63.17 | 0.5381 | |
| 28 | −43.73759 | 0.120 | | | | |
| 29 | 203.51567 | 8.733 | 1.44770 | 92.85 | 0.5345 | |
| 30 | −56.23642 | 3.102 | | | | |
| 31 | 170.21327 | 6.139 | 1.82474 | 46.45 | 0.5595 | |
| 32 | −139.98158 | 2.709 | | | | |
| 33 | 117.64258 | 6.904 | 1.49700 | 81.54 | 0.5375 | |
| 34 | −55.41364 | 1.350 | 1.86901 | 24.14 | 0.6172 | |
| 35 | 28474.09453 | 6.478 | | | | |
| 36 | −78.70364 | 1.190 | 1.88300 | 40.76 | 0.5668 | |
| 37 | −127.31523 | 42.018 | | | | |
| 38 | 83.01507 | 4.069 | 1.81600 | 46.62 | 0.5568 | |
| 39 | −114.29567 | 1.738 | | | | |
| 40 | 64.91417 | 3.660 | 1.90000 | 21.27 | 0.6272 | |
| 41 | −190.45785 | 1.060 | 1.88300 | 40.76 | 0.5668 | |
| 42 | 21.35550 | 1.326 | | | | |
| 43 | 22.29736 | 10.160 | 1.48749 | 70.24 | 0.5301 | |
| 44 | −23.39602 | 1.446 | 1.88300 | 40.76 | 0.5668 | |
| 45 | 99.26713 | 0.357 | | | | |
| 46 | 75.62039 | 10.021 | 1.48749 | 70.24 | 0.5301 | |
| 47 | −27.83660 | 0.000 | | | | |
| 48 | ∞ | 33.000 | 1.60859 | 46.44 | 0.5666 | |

TABLE 22B-continued

Example 6 Basic Lens Data

| Sn | R | D | Nd | vd | θgF |
|---|---|---|---|---|---|
| 49 | ∞ | 13.200 | 1.51633 | 64.05 | 0.5346 |
| 50 | ∞ | 18.977 | | | |

TABLE 23

Example 6 Specification

| | Wide-Angle End | Middle | Telephoto End |
|---|---|---|---|
| Zr | 1.00 | 1.96 | 40.50 |
| f | 9.836 | 19.561 | 398.368 |
| FNo. | 2.08 | 2.08 | 3.96 |
| 2ω(°) | 61.04 | 30.46 | 1.56 |

TABLE 24

Example 6 Distance between Groups

| | Wide-Angle End | Middle | Telephoto End |
|---|---|---|---|
| State of Focusing on Object at Infinity | | | |
| DD[4] | 10.415 | 7.915 | 10.415 |
| DD[10] | 1.909 | 28.043 | 86.333 |
| DD[12] | 1.183 | 18.374 | 31.044 |
| DD[20] | 114.193 | 71.719 | 3.248 |
| DD[25] | 4.604 | 6.252 | 1.264 |
| State of Focusing on Closest Object (at 2.8 m) | | | |
| DD[4] | 1.915 | 2.915 | 1.814 |
| DD[10] | 10.800 | 50.811 | 94.968 |
| DD[12] | 0.792 | 0.607 | 31.010 |
| DD[20] | 114.193 | 71.719 | 3.248 |
| DD[25] | 4.604 | 6.252 | 1.264 |

TABLE 25

Example 6 Amount of Movement During Focusing

| | Wide-Angle End | Middle | Telephoto End |
|---|---|---|---|
| GFm | −8.500 | −5.000 | −8.601 |
| GFr | 0.391 | 17.768 | 0.034 |

Example 7

Figure 10:
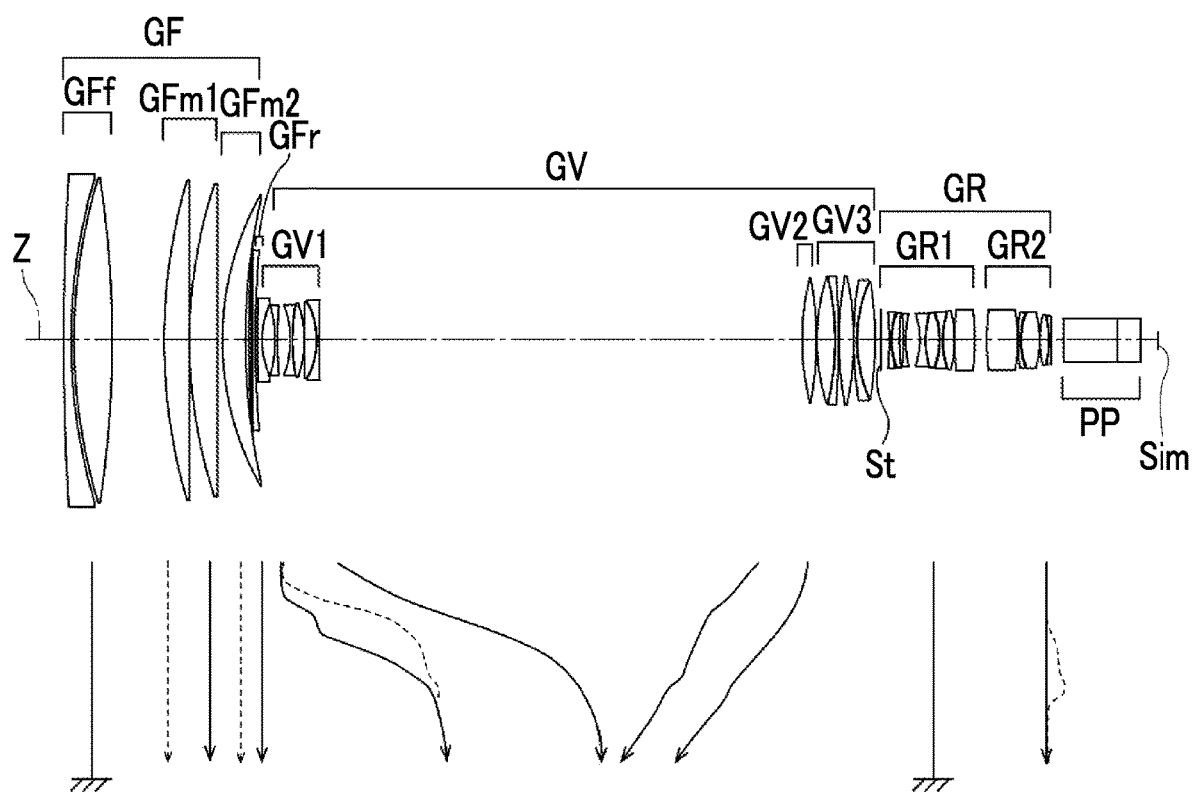
FIG. 10 is a diagram illustrating a cross-sectional view of a configuration of a zoom lens according to Example 7 of the present invention and a movement locus thereof.

FIG. 10 shows a cross-sectional view illustrating a configuration of the zoom lens of Example 7 and a movement locus. The zoom lens of Embodiment 7 consists of, in order from the object side to the image side, a focusing group GF, a zoom group GV, and a subsequent group GR. The focusing group GF consists of, in order from the object side to the image side, a front focusing group GFf, a middle focusing group GFm, and a rear focusing group GFr. The front focusing group GFf remains stationary with respect to the image plane Sim during zooming and focusing. The middle focusing group GFm consists of two lens groups of a first middle focusing group GFm1 and a second middle focusing group GFm2. The first middle focusing group GFm1 and the second middle focusing group GFm2 remain stationary with respect to the image plane Sim during zooming, and move along the optical axis Z during focusing. The rear focusing group GFr moves along the optical axis Z during zooming and focusing. The zoom group GV consists of, in order from the object side to the image side, three lens groups of a first zoom group GV1, a second zoom group GV2, and a third zoom group GV3. The three groups move along the optical axis Z by changing the distances between the groups during zooming. The subsequent group GR consists of a first subsequent group GR1 and a second subsequent group GR2. The first subsequent group GR1 remains stationary with respect to the image plane Sim during zooming and focusing. The second subsequent group GR2 moves along the optical axis Z during zooming and focusing.

Regarding the zoom lens of Example 7, Table 26A and Table 26B show basic lens data, Table 27 shows a specification, Table 28 shows the distance between the groups, Table 29 shows the amount of movement during focusing, and Table 30 shows aspheric surface coefficients. In Table 29, the amount of movements of the first middle focusing group GFm1, the second middle focusing group GFm2, the rear focusing group GFr, and the second subsequent group GR2 are shown in the columns denoted as "GFm1", "GFm2", "GFr", and "GR2", respectively. Further, FIG. 23 shows aberration diagrams in a state where the object at infinity is in focus, and FIG. 24 shows aberration diagrams in a state where the closest object is in focus. These data in a case where the object distance of the closest object is set to 3.5 m (meters).

TABLE 26A

Example 7 Basic Lens Data

| Sn | R | D | Nd | vd | θgF | |
|---|---|---|---|---|---|---|
| 1 | 1892.42907 | 4.400 | 1.84992 | 37.71 | 0.5771 | GFf |
| 2 | 365.52063 | 1.810 | | | | |
| 3 | 357.33464 | 23.177 | 1.43387 | 95.18 | 0.5373 | |
| 4 | −703.60857 | DD[4] | | | | |
| 5 | 364.13054 | 15.364 | 1.43387 | 95.18 | 0.5373 | GFm1 |
| 6 | ∞ | 0.120 | | | | |
| 7 | 320.15574 | 16.942 | 1.43387 | 95.18 | 0.5373 | |
| 8 | ∞ | DD[8] | | | | |
| 9 | 189.45973 | 14.049 | 1.43875 | 94.94 | 0.5343 | GFm2 |
| 10 | 415.55313 | DD[10] | | | | |
| 11 | 793.69122 | 1.812 | 1.54929 | 75.98 | 0.5413 | GFr |
| 12 | 4893.00789 | 2.000 | 1.73472 | 54.19 | 0.5440 | |
| 13 | 675.30930 | DD[13] | | | | |
| *14 | 967.79060 | 2.800 | 1.90366 | 31.31 | 0.5948 | GV1 |
| 15 | 55.27747 | 7.824 | | | | |
| 16 | −84.34950 | 1.600 | 2.00100 | 29.13 | 0.5995 | |
| 17 | 305.55040 | 7.804 | | | | |
| 18 | −62.15573 | 1.600 | 1.95375 | 32.32 | 0.5901 | |
| 19 | 124.84735 | 7.207 | 1.89286 | 20.36 | 0.6394 | |
| 20 | −74.22165 | 0.120 | | | | |
| 21 | 978.33694 | 7.469 | 1.80518 | 25.43 | 0.6103 | |
| 22 | −51.64316 | 1.620 | 1.80400 | 46.58 | 0.5573 | |
| 23 | 2336.90084 | DD[23] | | | | |
| 24 | 169.55767 | 8.578 | 1.49700 | 81.54 | 0.5375 | GV2 |
| *25 | −208.69266 | DD[25] | | | | |
| 26 | 137.11723 | 11.071 | 1.43700 | 95.10 | 0.5336 | GV3 |
| 27 | −174.66925 | 2.000 | 1.59270 | 35.31 | 0.5934 | |
| 28 | −608.29820 | 0.250 | | | | |
| *29 | 185.10125 | 9.034 | 1.43700 | 95.10 | 0.5336 | |
| 30 | −197.06629 | 0.120 | | | | |
| 31 | 247.85127 | 2.000 | 1.80000 | 29.84 | 0.6018 | |
| 32 | 93.80992 | 11.420 | 1.43700 | 95.10 | 0.5336 | |
| 33 | −222.68936 | DD[33] | | | | |

TABLE 26B

Example 7 Basic Lens Data

| Sn | R | D | Nd | vd | θgF | |
|---|---|---|---|---|---|---|
| 34 (St) | ∞ | 5.102 | | | | GR1 |
| 35 | −191.63395 | 1.400 | 1.77250 | 49.60 | 0.5521 | |
| 36 | 63.58653 | 0.120 | | | | |
| 37 | 44.07496 | 4.782 | 1.80518 | 25.42 | 0.6162 | |
| 38 | 152.92031 | 2.343 | | | | |
| 39 | −175.44424 | 1.400 | 1.48749 | 70.24 | 0.5301 | |
| 40 | 70.86539 | 8.564 | | | | |
| 41 | −50.82343 | 3.638 | 1.80440 | 39.59 | 0.5730 | |
| 42 | 61.25982 | 8.269 | 1.80518 | 25.43 | 0.6103 | |
| 43 | −46.73188 | 0.323 | | | | |
| 44 | −50.94211 | 1.812 | 1.95375 | 32.32 | 0.5901 | |
| 45 | 56.43861 | 7.200 | 1.72916 | 54.68 | 0.5445 | |
| 46 | −73.10134 | 0.120 | | | | |
| 47 | 220.54577 | 12.048 | 1.73800 | 32.26 | 0.5900 | |
| 48 | −220.54577 | DD[48] | | | | |
| 49 | 184.90304 | 18.833 | 1.67003 | 47.23 | 0.5628 | GR2 |
| 50 | −103.66824 | 0.120 | | | | |
| 51 | 147.89059 | 1.400 | 1.95375 | 32.32 | 0.5901 | |
| 52 | 44.92805 | 0.622 | | | | |
| 53 | 44.67021 | 11.234 | 1.51633 | 64.14 | 0.5353 | |
| 54 | −64.76032 | 0.120 | | | | |
| 55 | 66.29470 | 5.442 | 1.48749 | 70.24 | 0.5301 | |
| 56 | −66.29470 | 1.564 | 1.95375 | 32.32 | 0.5901 | |
| 57 | ∞ | DD[57] | | | | |
| 58 | ∞ | 33.000 | 1.60863 | 46.60 | 0.5679 | |
| 59 | ∞ | 14.200 | 1.51633 | 64.14 | 0.5353 | |
| 60 | ∞ | 10.382 | | | | |

TABLE 27

Example 7 Specification

| | Wide-Angle End | Middle | Telephoto End |
|---|---|---|---|
| Zr | 1.00 | 5.00 | 77.00 |
| f | 9.229 | 44.705 | 709.308 |
| FNo. | 1.76 | 1.77 | 3.65 |
| 2ω(°) | 64.30 | 13.66 | 0.88 |

TABLE 28

Example 7 Distance between Groups

| | Wide-Angle End | Middle | Telephoto End |
|---|---|---|---|
| State of Focusing on Object at Infinity | | | |
| DD[4] | 31.664 | 31.664 | 31.664 |
| DD[8] | 3.128 | 3.128 | 3.128 |
| DD[10] | 2.245 | 30.532 | 120.970 |
| DD[13] | 1.320 | 92.500 | 72.545 |
| DD[23] | 294.345 | 134.555 | 4.095 |
| DD[25] | 0.402 | 18.650 | 4.059 |
| DD[33] | 3.455 | 25.530 | 100.097 |
| DD[48] | 7.488 | 7.382 | 7.401 |
| DD[57] | 7.250 | 7.356 | 7.337 |
| State of Focusing on Closest Object (at 2.8 m) | | | |
| DD[4] | 0.164 | 0.164 | 0.164 |
| DD[8] | 20.670 | 20.670 | 20.670 |
| DD[10] | 15.203 | 109.489 | 135.078 |
| DD[13] | 2.320 | 27.500 | 72.395 |
| DD[23] | 294.345 | 134.555 | 4.095 |
| DD[25] | 0.402 | 18.650 | 4.059 |
| DD[33] | 3.455 | 25.530 | 100.097 |
| DD[48] | 7.488 | 7.621 | 7.317 |
| DD[57] | 7.250 | 7.117 | 7.421 |

TABLE 29

Example 7 Amount of Movement During Focusing

|  | Wide-Angle End | Middle | Telephoto End |
|---|---|---|---|
| GFm1 | −31.500 | −31.500 | −31.500 |
| GFm2 | −13.958 | −13.958 | −13.958 |
| GFr | −1.000 | 64.999 | 0.150 |
| GR2 | 0.000 | 0.238 | −0.084 |

TABLE 30

Example 7 Aspheric Surface Coefficient

| Sn | 14 | 25 | 29 |
|---|---|---|---|
| KA | 1.0000000E+00 | 1.0000000E+00 | 1.0000000E+00 |
| A3 | −1.8505954E−21 | −7.1721817E−22 | 6.6507804E−22 |
| A4 | 4.0660287E−07 | 1.6421968E−07 | −2.8081272E−07 |
| A5 | −6.4796240E−09 | −5.6511999E−09 | −8.0962001E−09 |
| A6 | 8.4021729E−10 | 1.7414539E−10 | 2.8172499E−10 |
| A7 | −4.5016908E−11 | 7.4176985E−13 | −1.6052722E−12 |
| A8 | 4.3463315E−13 | −9.7299399E−14 | −1.0541094E−13 |
| A9 | 3.5919548E−14 | 1.1281878E−15 | 2.1399424E−15 |
| A10 | −8.9257498E−16 | −4.4848875E−19 | −1.0917621E−17 |

Table 31 shows values corresponding to Conditional Expressions (1) to (3) of the zoom lenses of Examples 1 to 7. The corresponding values of Conditional Expression (2) are shown as values in the wide-angle end state, the middle focal length state, and the telephoto end state. Examples 1 to 7 are based on the d line. Table 31 shows the values on the d line basis.

TABLE 31

| Expression Number |  | Example 1 | Example 2 | Example 3 | Example 4 |
|---|---|---|---|---|---|
| (1) | DFrinf/DFrmax | 0.69 | 0.69 | 0.69 | 2.91 |
| (2) | 1/βFr (Wide-Angle End) | 0.934 | 0.934 | 0.934 | 0.712 |
|  | 1/βFr (Middle) | 0.934 | 0.934 | 0.934 | 0.760 |
|  | 1/βFr (Telephoto End) | 0.939 | 0.939 | 0.939 | 0.790 |
| (3) | fV1/fFr | 0.012 | 0.012 | 0.012 | 0.065 |

| Expression Number |  | Example 5 | Example 6 | Example 7 |
|---|---|---|---|---|
| (1) | DFrinf/DFrmax | 1.76 | 4.75 | 1.83 |
| (2) | 1/βFr (Wide-Angle End) | 0.868 | 0.866 | 0.917 |
|  | 1/βFr (Middle) | 0.871 | 0.891 | 0.927 |
|  | 1/βFr (Telephoto End) | 0.883 | 0.948 | 0.960 |
| (3) | fV1/fFr | 0.023 | 0.021 | 0.010 |

As can be seen from the above data, the zoom lenses of Examples 1 to 7 each are capable of achieving high magnification as a zoom ratio of 40 times or more while achieving high magnification while maintaining high optical performance by satisfactorily suppressing fluctuation in field curvature during focusing in the entire zoom range and satisfactorily correcting various aberrations in the entire zoom range.

Figure 25:
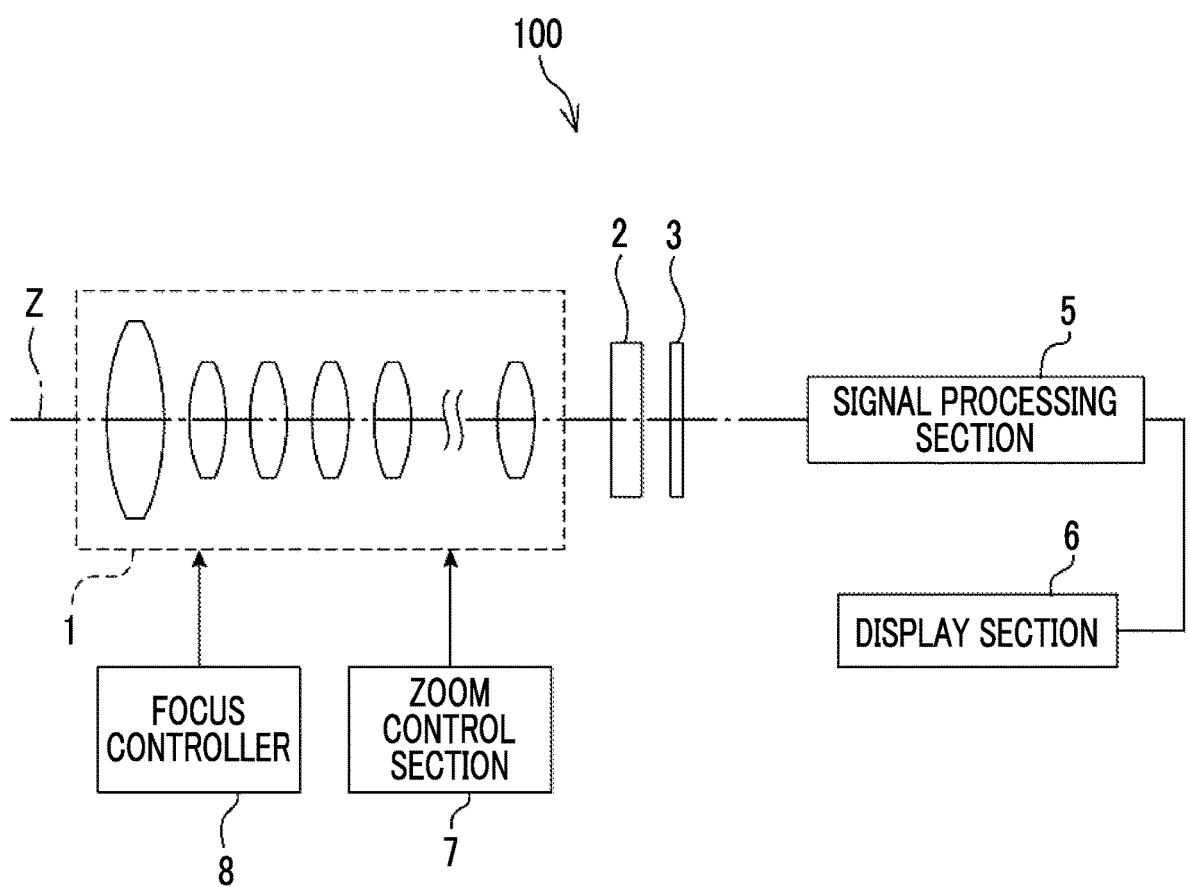
FIG. 25 is a schematic configuration diagram of an imaging apparatus according to an embodiment of the present invention.

Next, an imaging apparatus according to an embodiment of the present invention will be described. FIG. 25 is a schematic configuration diagram of an imaging apparatus 100 using the zoom lens 1 according to the above-mentioned embodiment of the present invention as an example of an imaging apparatus of an embodiment of the present invention. Examples of the imaging apparatus 100 include a broadcast camera, a movie imaging camera, a video camera, a surveillance camera, and the like.

The imaging apparatus 100 comprises a zoom lens 1, a filter 2 which is disposed on the image side of the zoom lens 1, and an imaging element 3 which is disposed on the image side of the filter 2. FIG. 25 schematically show a plurality of lenses provided in the zoom lens 1.

The imaging element 3 converts an optical image, which is formed through the zoom lens 1, into an electrical signal. For example, it is possible to use a charge coupled device (CCD), complementary metal oxide semiconductor (CMOS), or the like. The imaging element 3 is disposed such that the imaging surface thereof is coplanar with the image plane of the zoom lens 1.

The imaging apparatus 100 also comprises a signal processing section 5 which performs calculation processing on an output signal from the imaging element 3, a display section 6 which displays an image formed by the signal processing section 5, a zoom controller 7 which controls zooming of the zoom lens 1, and a focus controller 8 which controls focusing of the zoom lens 1. Although only one imaging element 3 is shown in FIG. 25, a so-called three-plate imaging apparatus having three imaging elements may be used.

The imaging apparatus 100 may be configured to move the rear focusing group GFr along the optical axis Z in accordance with the temperature change. In that case, for example, the imaging apparatus 100 may be configured to comprise means for detecting the position of the focusing group GF, the means for detecting the position of the zoom group GV, the means for detecting the temperature, and means for driving the rear focusing group GFr on the basis of the detection results of these three detecting means mentioned above. According to this configuration, it is possible to satisfactorily correct fluctuation in field curvature, fluctuation in spherical aberration, and fluctuation in focal position, which are caused by the temperature change, in accordance with the zoom position and the object distance.

In addition, the imaging apparatus 100 may be configured to move the rear focusing group GFr along the optical axis Z in accordance with the aperture value of the aperture stop St. In that case, for example, the imaging apparatus 100 may be configured to comprise means for detecting the position of the focusing group GF, the means for detecting the position of the zoom group GV, the means for detecting the aperture value of the aperture stop St, and means for driving the rear focusing group GFr on the basis of the detection results of these three detecting means mentioned above. According to this configuration, it is possible to satisfactorily correct fluctuation in spherical aberration and fluctuation in focal position, which are caused by change in aperture value of the aperture stop St, in accordance with the zoom position and the object distance.

The technology of the present invention has been hitherto described through embodiments and examples, but the technology of the present invention is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

What is claimed is:

1. A zoom lens consisting of, in order from an object side to an image side:
   a focusing group that includes a lens group moving during focusing;
   a zoom group that consists of two or more lens groups moving along an optical axis by changing a distance between lens groups adjacent to each other during zooming; and
   a subsequent group that has a lens group including a stop at a position closest to the object side,
   wherein the focusing group consists of, in order from the object side to the image side,
      a front focusing group which includes a negative lens and remains stationary with respect to an image plane during zooming and focusing,
      a middle focusing group which consists of one or two lens groups each moving along the optical axis by changing a distance between lens groups adjacent to each other during focusing and having a positive refractive power, and
      a rear focusing group which consists of one lens group moving along the optical axis by changing a distance between lens groups adjacent to each other during zooming and focusing and having a negative refractive power,
   wherein an amount of movement of the rear focusing group during focusing changes in accordance with a zoom position, and the rear focusing group has a zoom range in which the rear focusing group moves from the object side to the image side during focusing from an object at infinity to a closest object, and
   wherein assuming that
      an amount of movement of the rear focusing group during zooming from a wide-angle end to a telephoto end in a state in which the object at infinity is in focus is DFrinf,
      an amount of movement of the rear focusing group during focusing from the object at infinity to the closest object at a zoom position where the amount of movement of the rear focusing group is a maximum during focusing from the object at infinity to the closest object is DFr max, and
      a sign of each amount of movement of the rear focusing group is positive in a case where the rear focusing group moves from the object side to the image side, and is negative in a case where the rear focusing group moves from the image side to the object side,
   Conditional Expression (1) is satisfied, which is represented by $$0.2 < DFrinf/DFr\,max < 50 \qquad (1).$$

2. The zoom lens according to claim 1, wherein assuming that a lateral magnification of the rear focusing group in a state in which the object at infinity is in focus is βFr, in the entire zoom range, Conditional Expression (2) is satisfied, which is represented by $$0.5 < 1/\beta Fr < 0.995 \qquad (2).$$

3. The zoom lens according to claim 2, wherein Conditional Expression (2-1) is satisfied, which is represented by $$0.55 < 1/\beta Fr < 0.995 \qquad (2\text{-}1).$$

4. The zoom lens according to claim 1, wherein the front focusing group has a negative refractive power.

5. The zoom lens according to claim 1, wherein a sign of the refractive power of the focusing group in a state in which the object at infinity is in focus is positive in the entire zoom range.

6. The zoom lens according to claim 1, wherein all the lens groups in the middle focusing group move from the image side to the object side during focusing from an object at infinity to a closest object.

7. The zoom lens according to claim 1, wherein a zoom position at which the amount of movement of the rear focusing group is a maximum during focusing from the object at infinity to the closest object is closer to the wide-angle side than the telephoto end.

8. The zoom lens according to claim 1, wherein a lens group closest to the object side in the zoom group has a negative refractive power, and moves from the object side to the image side during zooming from the wide-angle end to the telephoto end.

9. The zoom lens according to claim 8, wherein assuming that
   a focal length of the lens group closest to the object side in the zoom group is fV1, and
   a focal length of the rear focusing group is fFr,
   Conditional Expression (3) is satisfied, which is represented by $$0.001 < fV1/fFr < 0.4 \qquad (3).$$

10. The zoom lens according to claim 9, wherein Conditional Expression (3-1) is satisfied, which is represented by $$0.002 < fV1/fFr < 0.3 \qquad (3\text{-}1).$$

11. The zoom lens according to claim 1, wherein the rear focusing group consists of one negative lens.

12. The zoom lens according to claim 1, wherein the rear focusing group consists of a cemented lens formed by cementing one negative lens and one positive lens.

13. The zoom lens according to claim 1, wherein an amount of movement of at least one lens group in the middle focusing group during focusing changes in accordance with the zoom position.

14. The zoom lens according to claim 1, wherein among the lens groups in the zoom group, at least one of the lens groups closer to the image side than the lens group closest to the object side moves during focusing, and the amount of movement during focusing changes in accordance with the zoom position.

15. The zoom lens according to claim 1, wherein at least one lens group in the subsequent group moves during focusing, and the amount of movement during focusing changes in accordance with the zoom position.

16. The zoom lens according to claim 1, wherein Conditional Expression (1-1) is satisfied, which is represented by $$0.3 < DFrinf/DFr\,max < 10 \qquad (1\text{-}1).$$

17. An imaging apparatus comprising the zoom lens according to claim 1.

* * * * *